(12) United States Patent
White et al.

(10) Patent No.: US 8,051,441 B2
(45) Date of Patent: Nov. 1, 2011

(54) PLAYER-READABLE CODE ON OPTICAL MEDIA

(75) Inventors: James Mitchell White, Niskayuna, NY (US); Marc Brian Wisnudel, Clifton Park, NY (US); Mark Rogers Johnson, Pasadena, CA (US)

(73) Assignee: NBCUniversal Media, LLC, Wilmington, DE (US)

( * ) Notice: Subject to any disclaimer, the term of this patent is extended or adjusted under 35 U.S.C. 154(b) by 771 days.

(21) Appl. No.: 12/059,438

(22) Filed: Mar. 31, 2008

(65) Prior Publication Data

US 2009/0245080 A1  Oct. 1, 2009

(51) Int. Cl.
 G11B 7/24  (2006.01)
 G11B 3/70  (2006.01)

(52) U.S. Cl. ........................ 720/718; 369/284

(58) Field of Classification Search ................. 369/284, 369/275.3, 288, 283, 275.4, 275.2, 275.1; 720/718, 725, 681
See application file for complete search history.

(56) References Cited

U.S. PATENT DOCUMENTS

| | | | |
|---|---|---|---|
| 4,374,001 A | 2/1983 | Bernier | |
| 4,444,626 A | 4/1984 | Bernier et al. | |
| 4,918,317 A | 4/1990 | Hess et al. | |
| 5,141,622 A | 8/1992 | Fauteux et al. | |
| 5,451,932 A | 9/1995 | Wunderlich et al. | |
| 5,491,262 A | 2/1996 | Hung | |
| 5,559,983 A * | 9/1996 | Masood | 711/112 |
| 5,699,047 A | 12/1997 | Tsai et al. | |
| 5,815,484 A | 9/1998 | Smith et al. | |
| 5,963,536 A | 10/1999 | Vasic et al. | |
| 6,633,853 B2 | 10/2003 | Oshima et al. | |
| 6,790,501 B2 | 9/2004 | van de Grampel et al. | |
| 6,795,464 B2 | 9/2004 | Lawandy | |
| 6,902,111 B2 | 6/2005 | Han et al. | |
| 6,990,671 B1 | 1/2006 | Evans et al. | |
| 7,127,066 B2 | 10/2006 | Solomon et al. | |
| 7,315,946 B1 | 1/2008 | Blumenfeld et al. | |

(Continued)

FOREIGN PATENT DOCUMENTS

WO  98/40930 A1  9/1998

(Continued)

OTHER PUBLICATIONS

Taylor, J., Johnson, M., Crawford, C.G., "DVD Demystified", 3rd Ed., McGraw-Hill; 2006, Chapter 7-1 to 7-30 and Chapter 9-1 to 9-33. ( 65 pages).

(Continued)

*Primary Examiner* — Allen Cao
(74) *Attorney, Agent, or Firm* — Fletcher Yoder PC

(57) ABSTRACT

An optical article for playback in a player includes a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic. A method of making the optical article, a method of customizing the optical article, a method and a system for the playback of the optical article are also included.

59 Claims, 7 Drawing Sheets

U.S. PATENT DOCUMENTS

| | | |
|---|---|---|
| 7,444,296 B1 | 10/2008 | Barber et al. |
| 7,653,919 B2 | 1/2010 | Potyrailo et al. |
| 2002/0163479 A1 | 11/2002 | Lin et al. |
| 2004/0022542 A1 | 2/2004 | Atkinson |
| 2004/0054594 A1 | 3/2004 | Forster et al. |
| 2004/0120236 A1 | 6/2004 | Suzuki et al. |
| 2005/0110978 A1 | 5/2005 | Potyrailo et al. |
| 2005/0167510 A1 | 8/2005 | Potyrailo et al. |
| 2006/0002269 A1 | 1/2006 | Bourget et al. |
| 2006/0028924 A1 | 2/2006 | Atkinson |
| 2006/0114755 A1 | 6/2006 | Eklund |
| 2006/0132309 A1 | 6/2006 | Posamentier |
| 2006/0159266 A1 | 7/2006 | Chavanne et al. |
| 2006/0177768 A1 | 8/2006 | Tauchi et al. |
| 2006/0227696 A1 | 10/2006 | Smith et al. |
| 2006/0234003 A1 | 10/2006 | Selinfreund |
| 2007/0024948 A1 | 2/2007 | Hirano et al. |
| 2007/0070867 A1 | 3/2007 | Forster et al. |
| 2007/0115762 A1 | 5/2007 | Wisnudel et al. |
| 2007/0116920 A1 | 5/2007 | Krishnan et al. |
| 2007/0116988 A1 | 5/2007 | Wisnudel et al. |
| 2007/0143774 A1 | 6/2007 | Agrawal et al. |
| 2007/0201502 A1 | 8/2007 | Abramson |
| 2009/0086587 A1 | 4/2009 | White et al. |
| 2009/0089821 A1 | 4/2009 | White et al. |
| 2009/0215620 A1 | 8/2009 | Cella et al. |
| 2009/0249381 A1* | 10/2009 | White et al. ............ 720/718 |
| 2009/0285074 A1 | 11/2009 | Wisnudel et al. |
| 2009/0285075 A1* | 11/2009 | Wisnudel et al. ............ 369/100 |
| 2009/0316565 A1* | 12/2009 | Hershey et al. ............ 369/273 |

FOREIGN PATENT DOCUMENTS

| | | |
|---|---|---|
| WO | 2004/095447 A1 | 11/2004 |

OTHER PUBLICATIONS

Labarge, R., "DVD Authoring and Production", CMP Books; 2001, pp. 30-37, 198-221, 452-453. (36 pages).

White, Ron, "How Computers Work", Millennium Ed., Que Corporation, Indianapolis, IN. 1999.

\* cited by examiner

PLAYER-READABLE CODE ON OPTICAL MEDIA

BACKGROUND

The invention relates generally to an optical article for playback in a player. More particularly the invention relates to providing an optical article with a customized player-readable code printed on the optical article that allows for customization and/or enhancing the security of the optical article and the data contained in the optical article.

A variety of methods have been tried in the art to provide optical media with unique identification codes. One such method includes a bar code known as a burst cutting area (BCA) which may be individually written to each replicated optical media. The bar code may be created by a very powerful laser that burns and darkens the reflective metal layer in the center of the bonded optical media, e.g., a DVD, yielding marks with decreased reflectivity. Because there is no player specification, the player would not need a support for reading the bar code. There is, however, a requirement for DVD-ROM drives to support the Mount Fuji specification, which includes a provision to read bar code information within the "read disc info" command. With the exception of the DIVX format, DVD Video players do not read BCA. Further, there are only a few DVD manufacturers equipped to write the bar codes on replicated discs. For these reasons, the universal application of BCA to give a disc a "unique ID" or to implement the BCA for enhanced security as described in this disclosure may not be very practical. In addition, there is no way to link logical decisions or authoring on the disc to the code contained in the BCA. Thus the content on the disc that is displayed during playback may not be customized through use of the BCA.

In certain cases, regional codes installed in the players themselves are checked during disc playback. The original idea behind this was to restrict playback of discs in certain regions of the world. In theory, a disc could be programmed to customize the content based on the regional code detected in the player during playback. In practice this is difficult because the regional codes are very coarse grained (5 regions worldwide), player compatibility to regional code readout is less than optimal, and there is no general control over movement of DVD players throughout regions. In addition, regional codes may often be altered in the players. In practice, regional codes are seldom used to customize content.

Also, there have been other efforts to serialize optical media for copy protection and/or digital rights management. A notable application of this technology is used by Microsoft for the "Product Activation" process for protecting computer software. In this method a laser may be used to burn additional data (Unique IDs) into the data spiral of optical discs. Certain other methods include incorporation of pits and lands on a disc that may be modified to create errors and the subsequent location of these errors can be translated into a unique serial number. Also CD-ROM encryption systems have been described where the information on a CD-ROM is encrypted by a key. The key may be programmed into the CD-ROM after manufacture by damaging selected sectors to be unreadable by conventional read systems. The selected sectors may be physically damaged by a high power laser. Another method includes a novel optical disc made by molding a dye-doped polycarbonate resin and marking marks of specific size and location into the polycarbonate substrate of the disc using a laser. Also, software detection methods for reading the unique identification codes from the disc have been disclosed for computer drives. These serialization techniques require some type of external software or firmware and are not practical on DVDs because the players would need to be modified.

Accordingly, there remains a need for an improved solution to the long-standing problem. The method described herein fills this need by employing a printing and authoring method that will permit the introduction of customized player-readable identification codes on the optical articles that can be read by using available readers without the need for specialized software or modified drive firmware wherein the authoring may be linked to the code.

BRIEF DESCRIPTION

One embodiment of the present disclosure is directed to an optical article for playback in a player. The optical article includes a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic.

Another embodiment of the disclosure is directed to a method for customizing an optical article for playback in a player. The method includes the steps of providing an optical article comprising a plurality of optically detectable marks disposed on a surface of the optical article; wherein the plurality of optically detectable marks are in a pre-determined combination of a first state and a second state; providing at least one first control logic comprising at least one sector on the optical article; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic.

Yet another embodiment of the present disclosure is directed to a system for playback of an optical article. The system includes an optical article comprising a plurality of optically detectable marks disposed on a surface of the optical article; wherein the plurality of optically detectable marks are in a pre-determined combination of a first state and a second state; and the optical article comprising at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic.

Still yet another embodiment of the present disclosure is directed to a method for playback of an optical article in a player. The method includes a step of providing an optical article comprising a plurality of optically detectable marks disposed on a surface of the optical article; wherein the plurality of optically detectable marks are in a pre-determined combination of a first state and a second state; wherein the optical article comprises at least one first control logic comprising at least one sector on the optical article; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic.

Still yet another embodiment of the present disclosure is directed to a method for making an optical article. The method includes a step of providing an optical article comprising a plurality of optically detectable marks disposed on a surface of the optical article; wherein the plurality of optically detectable marks are in a pre-determined combination of a first state and a second state; wherein the optical article comprises at least one first control logic comprising at least one sector on the optical article; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic.

Still yet another embodiment of the disclosure is directed to an optical article for playback in a player. The optical article includes a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic; wherein the first control logic is spaced at intervals in a data containing region of the optical article; wherein each first control logic is executed at intervals during the playback of a content in the optical article; and wherein the first control logic is executed as the optical article is read by a player; using a combination of the plurality of optically detectable marks in a pre-determined state associated with the first control logic.

Still yet another embodiment of the present disclosure is directed to a method of making an optical article for playback in a player. The method includes the steps of providing an optical article comprising a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic; wherein the first control logic is spaced at intervals in a data containing region of the optical article; wherein each first control logic is executed at intervals during the playback of a content in the optical article; and wherein the first control logic is executed as the optical article is read by a player; using a combination of the plurality of optically detectable marks in a pre-determined state associated with the first control logic.

Still yet another embodiment of the present disclosure is directed to a system for playback of an optical article in a player. The system includes an optical article comprising an optical article comprising a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic; wherein the first control logic is spaced at intervals in a data containing region of the optical article; wherein each first control logic is executed at intervals during the playback of a content in the optical article; and wherein the first control logic is executed as the optical article is read by a player; using a combination of the plurality of optically detectable marks in a pre-determined state associated with the first control logic.

Still yet another embodiment of the present disclosure is directed to a method for playback of an optical article in a player. The method includes the steps of providing an optical article comprising a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic; wherein the first control logic is spaced at intervals in a data containing region of the optical article; wherein each first control logic is executed at intervals during the playback of a content in the optical article; and wherein the first control logic is executed as the optical article is read by a player; using a combination of the plurality of optically detectable marks in a pre-determined state associated with the first control logic.

Still yet another embodiment of the present disclosure is directed to a method for customizing an optical article for playback in a player. The method includes a step of disposing a plurality of optically detectable marks on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic; wherein the first control logic is spaced at intervals in a data containing region of the optical article; wherein each first control logic is executed at intervals during the playback of a content in the optical article; and wherein the first control logic is executed as the optical article is read by a player; using a combination of the plurality of optically detectable marks in a pre-determined state associated with the first control logic.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
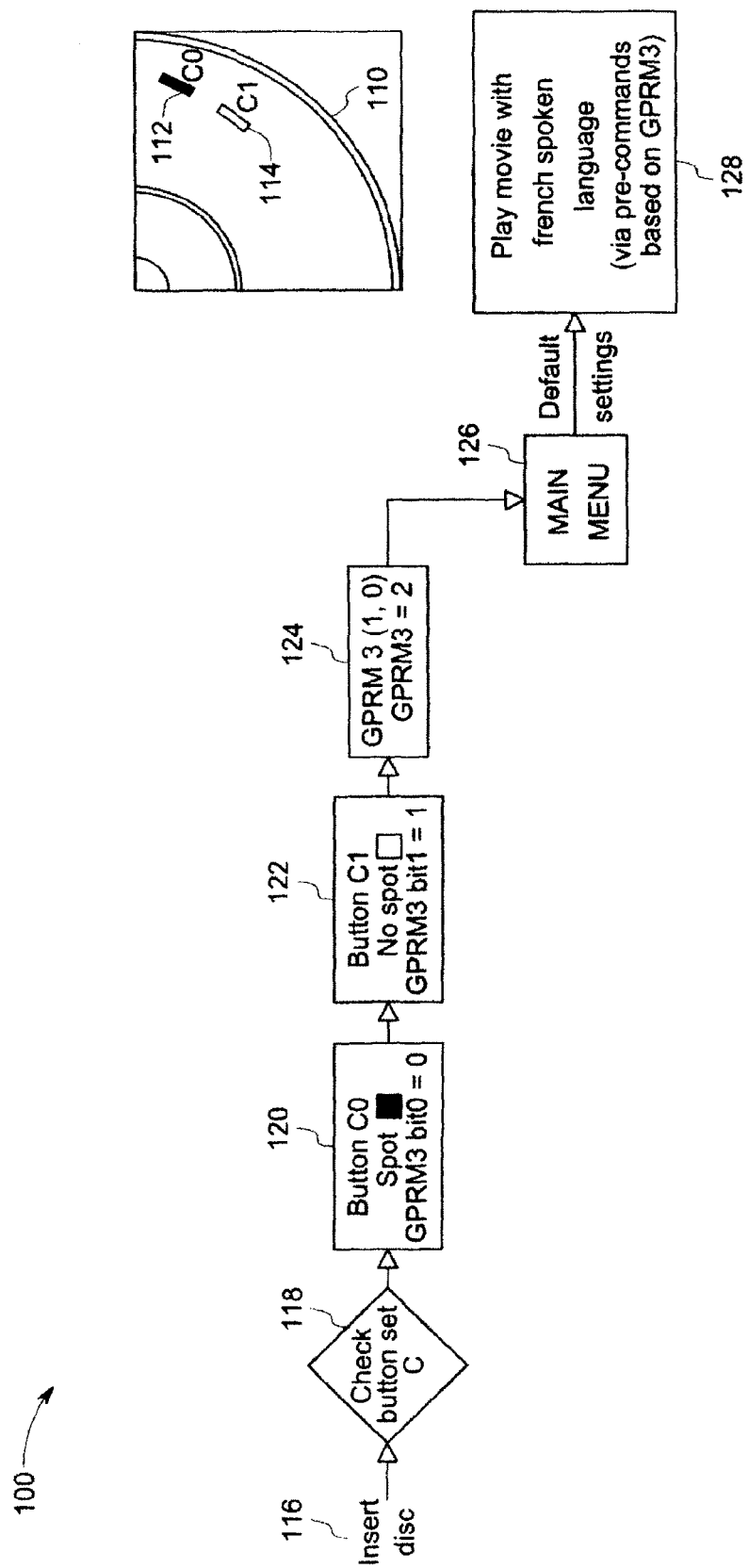
FIG. 1 shows a logical layout of an optical article in accordance with an exemplary embodiment described herein.

The invention relates generally to an optical article for playback in a player. More particularly the invention relates to providing an optical article with a customized player-readable that allows for customization and/or enhancing the security of the optical article and the data contained in the optical article.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise. "Operably coupled" is a relationship between listed parts that provides a stated function.

As used herein, the term "pre-activated" state of functionality refers to a state of functionality of the optical article where the mark has not yet been exposed to one or more activation signals, while the "activated" state refers to a state of functionality where the mark has been exposed to the activation signal. In one embodiment, the "pre-activated" state includes at least one mark which inhibits portions of the optical data layer that are located directly in the optical path of the incident laser light of an optical data reader from being read. The activated state includes a state of the optical article where the optical data layer can be read by the optical data reader as a result of the article being exposed to at least one external stimulus.

As used herein, the term "activated" state, refers to a state of functionality of the optical article in the vicinity of the mark where the optical data layer can be read by the optical data reader as a result of the optical article having been exposed to at least one authorized activation signal. In one embodiment, the optical state change material is at least partially transparent to the laser from the optical data reader, and does not inhibit the data located directly in the optical path of the laser from being read. In another embodiment, the optical state change material is at least partially absorbed by the laser from the optical data reader and prevents the data directly in the optical path of the laser from being read. As used herein the term "reflectivity" is defined as the ratio of reflected light to incident light.

Embodiments disclosed herein provide a modified optical article, for example a DVD, and a method that allows for a customized player-readable code including markings printed on a disc, wherein the code may be read by conventional DVD players and drives by utilizing control logics input in the discs. The control logics may be executed using forced activation commands. Forced activation commands may hence be required in the DVD specification to read the disc and it may be advantageous to have players that support this technology. The optical articles may be programmed to check the status of the marks during regular playback of the disc by a player and act with no external intervention i.e., no external network may be needed for validation. Thus, the technology described herein offers a tremendous advantage because a code is printed on the disc, read by the player, and acted upon via programming in the disc. If this method is used for POS activation, for example, there is no external intervention required from a database granting access privileges during playback. The activation code would be self-contained on the disc. The method may suffer on account of an only limitation i.e., the number of GPRM registers on the disc, which is limited to 16. Each GPRM has 16 bits, so a code printed on the disc using the FOAC methodology will be limited to 256 bits. However, for most of the applications described herein, 256 bits is more than sufficient.

One embodiment of the present disclosure is directed to an optical article for playback in a player. The optical article includes a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic.

In one embodiment, the optical article may be customized by printing a plurality of optically detectable marks on a surface of the optical article. Each optically detectable mark is associated with a first control logic. The first control logics are included near the startup area of the optical article. A customized player-readable code may be determined using the combination of the plurality of optically detectable marks in a pre-determined state and their associated first control logics thus enabling a player to set a default playback specification. In this embodiment, the optical article for example a DVD disc, may be customized for content distribution without re-mastering the discs, i.e., the master disc can be duplicated and the customization for content distribution may be achieved by printing the plurality of the optically detectable marks to be associated with particular first control logics during playback of the optical article.

In one embodiment, the customized player-readable code is determined using a second control logic, wherein the second control logic is configured to set the value of a first register by using a combination of the optically detectable mark in a pre-determined state and their associated control logics. In one embodiment, the second control logic sets the value of the first register based on the combined states of the plurality of optically detectable marks. In another embodiment, the second control logic sets the value of the first register based on the combined states of a part of the plurality of optically detectable marks. In one embodiment, for each bit of the customized player-readable code a player is directed to set the non-default value of the register using a forced activation method, wherein the register has a default value before it is set and a non-default value after it is set. For example, if a 4 bit code is imprinted on the disc, the player checks the code, and uses the control logic to set the General Parameter (GPRM) registers that control the default audio stream to be shown during playback of the disc, based on the value of the GPRM register.

In one embodiment, the customized player-readable code provides a default version of playback of a content in a pre-determined configuration. In one embodiment, the customized player-readable code provides a default language track to be used during playback. For example if the optical article is a movie DVD containing the following play back options, i.e., play with English as the spoken language, play with French as the spoken language, play with English as the subtitle and play with French as the subtitle, the player may set the default play back option as play with French subtitles, based on the customized player-readable code and the value of the GPRM register which is derived using the control logic. However, the other audio streams would still be available and could be specified by accessing the language menu. However, if the feature is played directly the play back option specified by the printed customized player-readable code may be used, i.e., in this case play with French subtitles. In this manner, the default language may be customized at the point of manufacture using this methodology.

In another embodiment, the customized player-readable code provides advertisements customized to retailer demographics during playback. In another embodiment, the customized player-readable code provides advertisements customized to a retailer during playback. In yet another embodiment, the customized player-readable code provides advertisements customized to geographical locations during playback. In yet another embodiment, the customized player-readable code provides in-feature product placements customized to a retailer during playback. In still yet another embodiment, the customized player-readable code provides play of special features customized to a retailer during playback. In still yet another embodiment, the customized player-readable code provides a selection of one or more of a language, a scene, a parental setting, an audio track, and a subtitle during playback. In various other embodiments, the methodology of customizing disclosed herein could be utilized to customize different versions of a movie using the same master DVD, wherein certain scenes from the movie may be deleted, foul language may be omitted, small advertising segments may be added, new songs may be introduced, or different new endings may be introduced, or some other information may be available after a particular number of viewings.

In yet another embodiment, the customized player-readable code provides a serialized identification number of the optical article. In one embodiment, wherein the first control logic is spaced at intervals in a data containing region of the optical article; and wherein the first control logic is executed as the optical article is read by a player; using a combination of the plurality of optically detectable marks in a pre-determined state associated with the first control logic. For example, a lottery ticket included in a DVD used in sweepstakes. In one embodiment, when the disc is inserted in the player and during playback of the disc, lottery numbers may be revealed based on the customized player-readable code printed on the disc. The "ticket-on-DVD" numbers may be inserted at a secure location in the content of the disc and may be displayed at intervals during the play back of the content from the disc while being viewed by an user. Once the user obtains the complete set of a serialized number inserted in that DVD, the user may cross-check the number with a list maintained by the DVD vendor or the sweepstake provider. This in an exact analogy to a lottery drawing with paper tickets, where a person picks up the lottery from a collection of paper lottery tickets and cross-checks the number with the provider.

In one embodiment, the mark of a plurality of optically detectable marks includes an optical state change material including a dye or a reactive material. In one embodiment, a mark of the plurality of optically detectable marks is opaque in the first state and is transparent in the second state. In another embodiment, a mark of the plurality of optically detectable marks is transparent in the first state and is opaque in the second state. As used herein the term "optical state change" material is used to describe a material which is capable of existing in at least two different forms, each form possessing a unique optical state, for example a unique wavelength associated with a maximum optical absorbance within a range from about 200 nm to about 800 nm, or a unique extinction coefficient at a specific wavelength between about 200 nm to about 800 nm. Non-limiting examples of optical state change materials include halochromic optical state change materials, photo-bleachable materials, polymeric materials, organic compounds, hydrogels, liquid crystalline materials, leuco dyes, inorganic compounds such as, but not limited to, metal oxides and organometallic compounds, materials capable of undergoing a sigmatropic bond rearrangement, and reactive adduct materials. In various embodiments, the optical state change materials may undergo the optical state change under the influence of a thermal stimulus i.e., may be thermochromic or an electrical stimulus i.e., may be electrically responsive. The term "thermochromic" as used herein, describes materials that undergo either a reversible or an irreversible thermally induced color change. The term "electrically responsive" as used herein, describes materials that undergo either a reversible or an irreversible electrically induced color change.

One suitable halochromic optical state change material that may be used in the mark is a chromic dye. As described herein the term "halochromic" describes a material which changes optical state for example, color, upon a change in pH i.e., a change in the acidity or basicity results in a change in the optical absorbance of the chromic dye. This process is also known as "acidichromism" or "halochromism". For example, the mark may contain a dye i.e., a pH responsive dye such as for example a triaryl methylene dye. One example of a triaryl methylene dye is the sodium salt of bromocresol green, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the mark. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

Non-limiting examples of dyes that can be used include bromocresol green, bromocresol purple, bromophenol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine. Non-limiting examples of photo-bleachable materials may include dye compounds selected from xanthenes, thiazines, oxazines, triarylmethines, lactones, cyanines, fulgides, spiropyrans, and diarylethenes. Examples of dye compounds can include, but are not limited to, methylene blue, toluidine blue, Rose Bengal, erythrosine B, eosin Y, fluorone dyes.

In one embodiment, where the optical article includes a DVD and the plurality of optically detectable marks are in a first state the DVD may be considered to be in a "pre-activated" state of functionality which is characterized by an optical reflectivity of at least a portion of the optical article being substantially less than about 45 percent. In another embodiment, the "pre-activated" state of functionality is characterized by an optical reflectivity of at least a portion of the optical article being less than about 20 percent. In yet another embodiment, the "pre-activated" state of functionality is characterized by an optical reflectivity of at least a portion of the optical article being less than about 10 percent. In these embodiments, the data in the optical data layer of the optical storage medium is not readable in the pre-activated state. It should be appreciated that any portion of the optical article that has an optical reflectivity of less than about 45 percent may not be readable by the optical data reader of a typical DVD player. Furthermore, the activated state is characterized by an optical reflectivity of that same portion of the optical article being substantially more than about 45 percent.

It should be appreciated that there are analogous predetermined values of optical properties for activating different optical articles. For example, the specified (as per ECMA-267) minimum optical reflectivity for DVD-9 (dual layer) media is in a range from about 18 percent to about 30 percent and is dependent upon the layer (0 or 1).

The control logic is comprised of FOAC commands in an optical article and make a logical decision depending on the state of the plurality of optically detectable marks i.e., if the plurality of marks are in a combination of a first state and a second state, the player is directed to play the feature content on the optical article. The FOAC commands are discussed in detail in a co-pending application U.S. application Ser. No. 11/864,544 filed on Sep. 28, 2007. The optical article includes a first control logic comprising at least one sector configured to set the value of a first register, the first register having a default value before it is set, and a non-default value after it is set, and a first command to be read sequentially after the sector. The first command is configured to direct the player to play a first content on the article if the first register is set to the default value and to direct the player to play a second content on the article if the first register is set to the non-default value.

In one embodiment, the plurality of optically detectable marks comprising an optical state change material may be printed on the surface of the optical article using a method selected from one or more of a screen-printing method, a ink-jet printing method, a direct write method, a pad printing method, a microarray deposition method, a capillary dispensing method, a gravure printing method, a thermal transfer printing method, and adhesion of pre-made polymer films. In one embodiment, the marks comprising an optical state change material may be printed on a surface of a data containing region of the optical article.

In one embodiment, the state of a mark of the plurality of the marks comprising the optical state change material is modified using one or more of a laser, a thermal energy, an electromagnetic radiation, a gamma ray, an acoustic wave, an electrical energy, a chemical energy, a magnetic energy, a mechanical energy, a radio frequency wave, and an ultraviolet radiation depending on the type of optical state change material included in the plurality of optically detectable marks.

In various embodiments, the mark may be deposited in a discrete area on the optical article, such that at least one mark, at least one line, at least one radial arc, at least one patch, a continuous layer, or a patterned layer extends across at least a portion of the optical article. One or more marks may be deposited on the optical article in various forms, such as a discrete portion, a continuous film, or a patterned film. During activation, the mark may be stimulated in a continuous, discontinuous or pulsed form.

In one embodiment, the customized player-readable code on an optical article may be pre-determined at the manufacturing point. The plurality of optically detectable marks comprising an optical state change material may be printed in a manner such that the marks are in a pre-determined combination of a first state or a second state with respect to their associated first control logics, which enables a player to read the customized player-readable code and hence renders the content in the optical article accessible to a set default mode. A legitimate user may purchase the optical article knowing the default mode and can directly play the disc in a player.

In another embodiment, the plurality of optically detectable marks may be printed in a manner such that in order to make the content in the disc accessible to a legitimate user, the marks comprising a optical state change material may need to be activated in manner so as to provide a pre-determined combination of a first state or a second state with respect to their associated first control logics, which enables a player to read the customized player-readable code, and hence render the disc playable in the set default mode.

In one embodiment, an activation signal may be employed to change the state of a mark of the plurality of the marks of a plurality of optically detectable marks comprising an optical state change material from a first state to a second state. As discussed above, in one embodiment, the mark in a first state of functionality may be opaque and in a second state of functionality may be transparent to the laser of a player and in another embodiment, the mark in a first state of functionality may be transparent and in a second state of functionality may be opaque to the laser of a player. In various embodiments, the activation signal may include one or more of a laser, a thermal energy, an electromagnetic radiation, a gamma ray, an acoustic wave, an electrical energy, a chemical energy, a magnetic energy, a mechanical energy, a radio frequency wave, and an ultraviolet radiation depending on the type of optical state change material included in the optically detectable marks.

In another embodiment, the optically detectable marks comprise static marks. In one embodiment, the static marks may be created on the surface of the optical article using heat distortion techniques known to one skilled in the art. For example, when the customized player-readable code is determined using a combination of the static marks and the first control logic, instead of printing marks comprising a optical state change material and subjecting the marks to an activation signal to result in a state change, tags comprising heating elements may be attached to the optical article. When the optical article is activated using a POS equipment, the POS equipment may provide an electrical impulse to the tags, and the electrical impulse is converted to heat by the heating element. This heat results in distorting pre-determined data containing regions on the surface of the DVD resulting in the formation of static marks on the DVD. In various other embodiments, the static marks may be made using an irreversible print method such as a solvent that permanently clouds the optical article, a powerful laser that marks the reflective layer of the disc, or a small heater that distorts the readout surface of the optical article. In one embodiment, the static marks are not reversible. In one embodiment, the optical article comprises a combination of a plurality of optically detectable marks comprising an optical state change material and static marks.

In one embodiment, the default settings for an optical article may be modified at the POS machine by a user. The optical article i.e., DVD disc could have a plurality of optically detectable marks comprising an optical state change material printed on it. An activation machine i.e., the POS machine could be interfaced with the disc that may allow the user to input a set of preferences, such as for example, if the user wants a certain language and parental setting, they could input this information to the POS machine. The POS machine could bleach the marks on the disc i.e., change the state of the marks on the disc, to derive the right combination of the customized player-readable code. This may enable the user to obtain a desired playback. Thus there may be one master disc including a single mastering or authoring step. This master disc may be replicated a number of times. The plurality of optically detectable marks comprising an optical state change material is printed on these replicated discs comprising associated first control logics thereby enabling a very large number of potential disc settings with a single authoring or mastering step. Each individual disc may be modified to achieve a customized playback, or if not modified will playback in the default mode. Activating the customized player-readable code in a pre-determined fashion by combining the information derived from the state of the optically detectable marks and the control logic ensures customization of each disc to provide a particular play back option as desired by a user. Further, the user experience may be enhanced, because the user will have the opportunity to specify exactly how the disc needs to be played back. Therefore, this methodology may be convenient since the optical article has to be activated before use for security reasons and the activation may also result in customizing the disc based on a user specified play back mode. Similarly in the case of a plurality of optically detectable marks where the marks are static, as discussed above tags with heating elements may be disposed on the DVD instead of printing of the marks. The electric impulse from the POS when transformed to heat at the heating element results in the formation of a pre-determined set of heat distorted static marks on the data containing region of the DVD. The customized player-readable code is then read by using the combination of the static marks and their associated first control logics.

As used herein, the term "optical article" refers to an article that includes an optical data layer for storing data. The stored data may be read by, for example, an incident laser of an optical data reader device such as a standard compact disc (CD) or digital versatile disc (DVD) drive, commonly found in most computers and home entertainment systems. In some embodiments, the optical article may include one or more data layers. Furthermore, the optical data layer may be protected by employing an outer coating, which is transparent to the incident laser light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage. In one embodiment, the first surface of the optical article includes a polycarbonate.

Another embodiment of the disclosure is directed to a method for customizing an optical article for playback in a player. The method includes the steps of providing an optical article comprising a plurality of optically detectable marks disposed on a surface of the optical article; wherein the plurality of optically detectable marks are in a pre-determined combination of a first state and a second state; providing at least one first control logic comprising at least one sector on the optical article; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic. In one embodiment, a printing mechanism is aligned to the optical article in a manner such that the plurality of optically detectable marks are printed in a pre-determined data containing region on the optical article.

Yet another embodiment of the present disclosure is directed to a system for playback of an optical article. The system includes an optical article comprising a plurality of optically detectable marks disposed on a surface of the optical article; wherein the plurality of optically detectable marks are in a pre-determined combination of a first state and a second state; and the optical article comprising at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic.

Still yet another embodiment of the present disclosure is directed to a method for playback of an optical article in a player. The method includes a step of providing an optical article comprising a plurality of optically detectable marks disposed on a surface of the optical article; wherein the plurality of optically detectable marks are in a pre-determined combination of a first state and a second state; wherein the optical article comprises at least one first control logic comprising at least one sector on the optical article; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic.

Still yet another embodiment of the present disclosure is directed to a method for making an optical article. The method includes a step of providing an optical article comprising a plurality of optically detectable marks disposed on a surface of the optical article; wherein the plurality of optically detectable marks are in a pre-determined combination of a first state and a second state; wherein the optical article comprises at least one first control logic comprising at least one sector on the optical article; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic.

Referring to FIG. 1, a logical layout of content 100 in an optical article is provided. In FIG. 1 is also shown an optical article 110. A 2 bit code which would enable setting the optical article to a default language is included near the startup area of the optical article during manufacturing. The 2 bit code provides an input to a pre-command logic to execute a language stream based on the value of a GPRM3 register. For example, the original default language in the main menu of the master disc manufactured for a particular movie with English spoken language is English. When the value of GPRM3 register is 3, which is the value of GPRM3 calculated from the customized player-readable code when an unmarked disc is played, the disc plays with English as the spoken language. When GRPM3 is set to the original default value of 3, the disc functions in a manner as if no customized player-readable code may be printed on the disc.

In an embodiment where a change in the default language setting is desired, the value of GPRM3 may be changed using the customized player-readable code printed on the optical article. The customized player-readable code printed on the optical article in combination with pre-command logics included in the feature content of the disc will enable the player to play the optical article in the original default or modified default mode. For example, if the value of the GPRM3 register is 3, which is the original default value of the disc, the disc will play the movie with English spoken language, as if no customized player-readable code were printed on the optical article. However if the value of the GPRM3 register is 0, the disc will play the movie with French subtitles; if the value of the GPRM3 register is 1, the disc will play the movie with English subtitles; and if the value of the GPRM3 register is 2, the disc will play the movie with French spoken language.

From here on "button" will refer to a forced activated button command, which are grouped into subsets for convenient reference to a GPRM register, for example subset C is associated with GPRM3 and accordingly "button C0" refers to a forced activated button command to change bit0 of GPRM3 from 0 to 1, etc. Each button may alternatively referred to as a "bit code" and is grouped according to its GPRM and bit, i.e., "bit code C0" refers to bit0 of GPRM3. The optical article 110 indicates a sector 114 where a control logic button C0 is obscured by an opaque mark and a sector 112 where a control logic button C1 is obscured by no mark or a transparent mark. The marks may contain optical state change materials, such as for example, a heat-sensitive dye. Once the optical article is inserted in the player 116, the player may perform the function of checking 118 the button set C i.e., button C0 and button C1. The default value of GPRM3 bit 0 for button C0 where the mark is opaque is 0 120 and the default value of GPRM3 bit 1 for button C1 where the mark is transparent or where there is no mark, is 1 122. The player sets the value of the GPRM3 (1,0) 124 as equal to 2, and moves on to the main menu 126. As indicated above if the value of the GPRM3 register is 2, the disc will be set to a default to play a movie with French spoken language 128. As discussed above, in one embodiment, the disc may be manufactured with the mark over button C0 as opaque and the mark over button C1 as transparent, such that when the disc is inserted in the player the disc is played back in the modified default mode. In another embodiment, the disc may be manufactured with both the marks as opaque. In this case, when the disc is activated, say for example, at the POS, the POS machine may be programmed in a manner such that, with an input from the purchaser, the mark over button C1 is rendered transparent and the mark over button C0 remains opaque. The disc so activated when inserted in the player, is played back in the modified default mode that is desired by the consumer. The other (non-default as specified by the customized player-readable code) audio streams would still be available and could be specified through access of the language menu, however, if the feature is played directly the language specified by the customized player readable code would be used. In one embodiment, when the DVD contains some additional information that may be available after a particular number of viewings the data containing region of the DVD containing this information may be covered with photo-bleachable marks which get bleached by the DVD player laser over a period of the disc being viewed. The DVD player may then have access to this additional information.

Still yet another embodiment of the disclosure is directed to an optical article for playback in a player. The optical article includes a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic; wherein the first control logic is spaced at intervals in a data containing region of the optical article; wherein each first control logic may be executed at intervals during the playback of a content in the optical article; and wherein the first control logic is executed as the optical article is read by a player; using a combination of the plurality of optically detectable marks in a pre-determined state associated with the first control logic.

In one embodiment, customized player-readable code may enable ideas such as a "lottery ticket on DVD". In one embodiment, when the disc is inserted in the player and during playback of the disc, lottery numbers may be revealed based on the customized player-readable code printed on the disc. The "ticket-on-DVD" numbers may be inserted at a secure location in the content of the disc and may be displayed during the play back of the content from the disc while being viewed by an user. This in an exact analogy to a lottery with paper tickets, where a person gets his or her numbers from a paper lottery ticket, the main difference is that in a lottery-on-DVD, content can be inserted that the user must watch in order to enable them to see their lottery numbers.

In one embodiment, advertisements or promotional materials may be inserted into the DVD so that, in order to see their lottery numbers, the user may be forced to watch the entire DVD and hence watch all the advertisements. In certain embodiments, the player functions, such as fast forward may be disabled, and the video revealing each number may be interspersed among advertisements so that the user is guaranteed to see the advertisements.

In the past this would require authoring and mastering several different versions of a DVD with different numbers, and was not very practical and economic. A customized player-readable printable code allows a single master disc to be made, and the differentiation in the various discs is made on replicated discs in a downstream print process. This is easily realized using an inkjet printer, for example, where a different pattern may be printed on consecutive print passes. A bar code may also be printed on the disc to allow for easy verification of the winning DVD.

Figure 6:
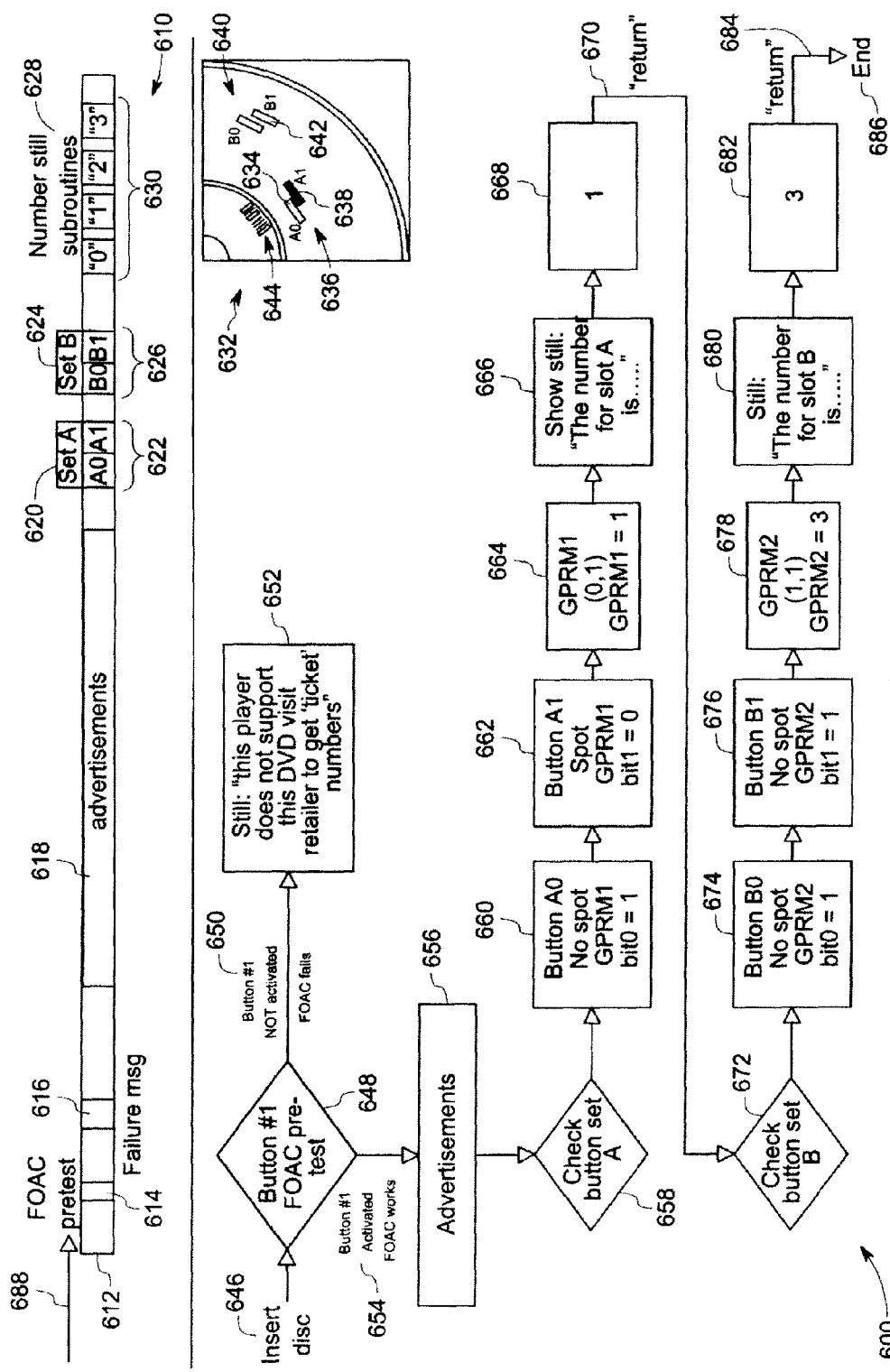
FIG. 6 shows a logical layout of an optical article in accordance with an exemplary embodiment described herein.

An example of how the Lottery-on-DVD would work is given in FIG. 6. Referring to FIG. 6, a logical layout of content 600 in an optical article is provided. In FIG. 6 is also provided a section 610 of layer 0 612 of an optical article DVD9 or single layer of a DVD5. The layer indicates a region 614 including a FOAC pre-test command and a region containing failure message 616. The layer also includes a region including the advertisements 618. Further, the layer includes a first set of customized player-readable codes 620 including a SET A of 2 bit codes 622 (A0 and A1) and a second set of customized player-readable codes 624 including a SET B of 2 bit codes 626 (B0 and B1). The customized player-readable codes SET A 620 provide the number for slot A and SET B 624 provides the number for slot B. The layer also includes a set of stills 628 that display the numbers 630 on the screen, based on the values of the customized player readable codes read from SET A and SET B. Because the number of still images that can be set on a DVD player is limited, the access to the number displays is in a subroutine format; i.e., there will be a set of stills with numbers equal to the set of numbers that is possible in each subset of player readable codes. During playback, when the number is determined for each code set, the player will be directed to display the appropriate number still briefly, then return to the point in the program and continue determining the lottery numbers by reading the next code set. The arrow 688 indicates the direction in which the laser light of the player moves over the section of layer 0 from the center to the outer edge of the optical article.

In FIG. 6 is also shown a section of an optical article. Two sets of 2 bit codes are printed on the optical article. Each 2 bit code which would enable drawing of the numbers is included in SET A 636 having an opaque mark 638 covering bit code A1 and no mark or transparent mark 634 covering bit code A0 and in SET B 640 having two no mark regions or transparent marks 640 covering bit code B0 and B1. In one embodiment, a bar code 644 may be printed for verification of the disc.

In the logical layout 600 shown in FIG. 6, when the disc is inserted 646 in a player, the player performs a FOAC pre-test 648 on the disc to determine if the button #1 is activated if bit is equal to 1. If the Button #1 is not activated 650, i.e., the bit is equal to 0, the FOAC command fails and the failure message 652 included in the failure message region 616 pops up as a still message "this player does not support this DVD. Visit retailer or website to get 'lottery ticket numbers'". If the Button #1 is activated 652 the FOAC command works and the player moves forward and reads the advertisement 656. The player then checks the button SET A 658 and determines the state of functionality of the marks that cover the buttons in SET A and uses the FOAC commands to set the value of the GPRM registers for the two bits represented by the two buttons in SET A. For example, button A0 has no mark or a transparent mark GPRM1 bit 0 is equal to 1 660, and button A1 has an opaque mark GPRM1 bit 1 is equal to 0 662. The player determines the GPRM1 for SET A to be equal to 1 with GPRM1 values of (0,1) and subsequently shows a still message 666 "The number for slot A is" and a number '1' for example is displayed on the screen 668. The player then returns 670 to play a portion of the advertisement or content in the disc. The player again moves on and checks the button SET B 672 and determines the state of functionality of the marks that cover the buttons in SET B and uses the FOAC commands to set the value of the GPRM registers for the two bits represented by the two buttons in SET B. For example, button B0 has no mark or a transparent mark GPRM2 bit 0 is equal to 1 674, and button B1 has no mark or a transparent mark GPRM2 bit 1 is equal to 1 676. The player determines the GPRM2 for SET B 678 to be equal to 3 with GPRM2 values of (1,1) and subsequently shows a still message 680 "The number for slot B is" and a number '3' for example is displayed on the screen 682. The player then returns 684 to play a portion of the advertisement or content in the disc or goes to the end of the disc.

Figure 7:
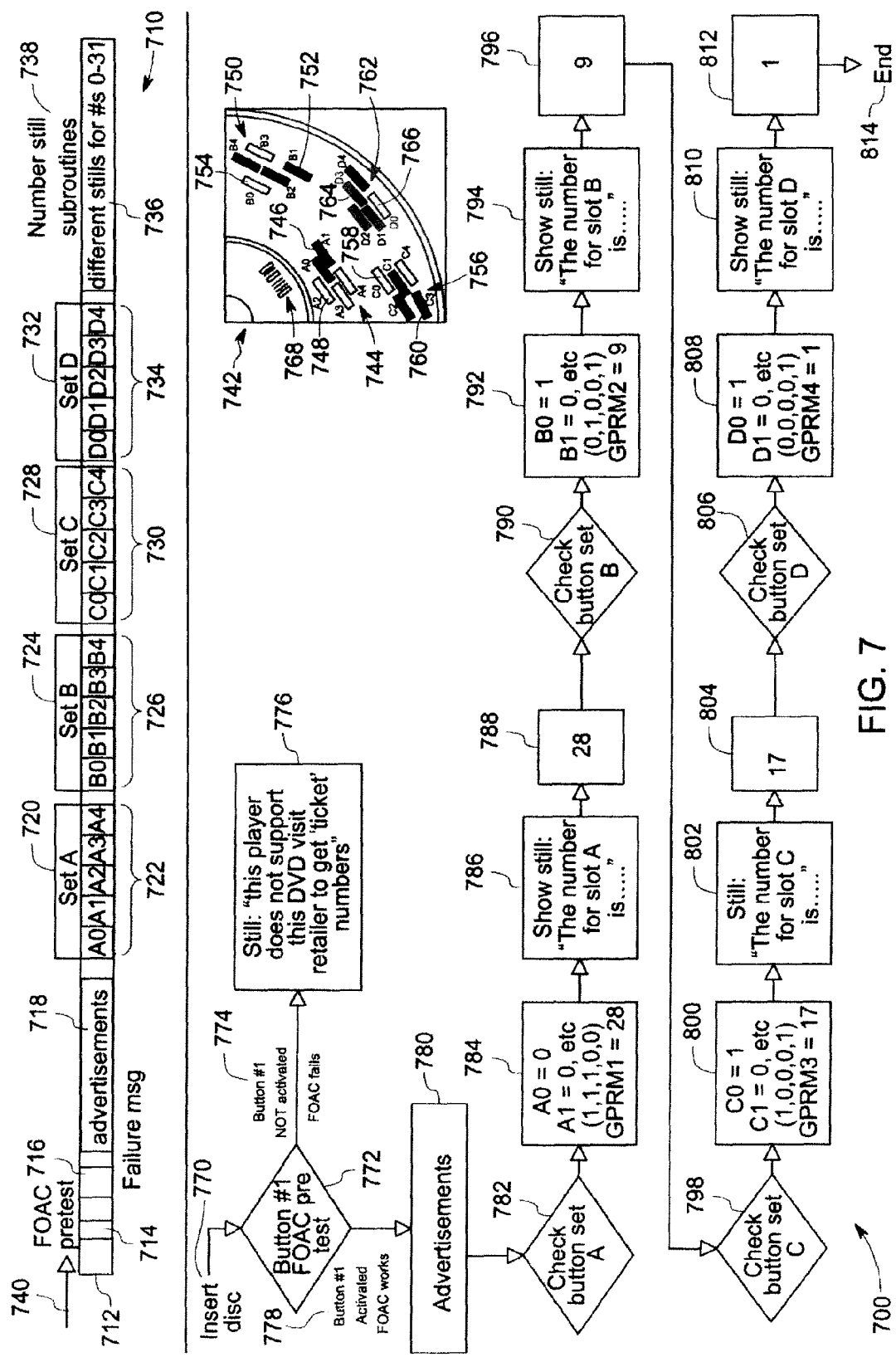
FIG. 7 shows a logical layout of an optical article in accordance with an exemplary embodiment described herein.

A more realistic example is shown in FIG. 7. Subroutines with stills showing the numerical values may be used to show the number in each "slot" of the ticket individually. This greatly simplifies the authoring of the disc by reducing the number of stills that must be created to display, in FIG. 7 this number is 32 possibilities, instead of 324 or 1,048,576 possibilities if the numbers for all slots had to be shown at once. A FOAC pre-check is employed to make sure that the player is compatible with the FOAC button activation technology.

Referring to FIG. 7, a logical layout of content 700 in an optical article is provided. In FIG. 7 is also provided a section 710 of layer 0 712 of an optical article DVD9 or single layer of a DVD5. The layer indicates a region 714 including a FOAC pre-test command and a region containing failure message 616. The layer also includes a region including the advertisements 718. Further, the layer includes a first set of customized player-readable codes 720 including a SET A of 5 bit codes 722 (A0, A1, A2, A3, and A4), a second set of customized player-readable codes 724 including a SET B of 5 bit codes 726 (B0, B1, B2, B3, and B4), a third set of customized player-readable codes 728 including a SET C of 5 bit codes 730 (C0, C1, C2, C3, and C4), and a fourth set of customized player-readable codes 732 including a SET D of 5 bit codes 734 (D0, D1, D2, D3, and D4). The customized player-readable codes SET A to SET D provide numbers for slots A to D respectively. The layer also includes a set of stills that display the numbers 736 on the screen, based on the values of the customized player readable codes read from SET A and SET B. Because the number of still images that can be set on a DVD player is limited, the access to the number displays is in a subroutine format 738; that is there will be a set of stills with numbers equal to the set of numbers that is possible in each subset of player readable codes. During playback, when the number is determined for each code set, the player will be directed to display the appropriate number still briefly, then return the point in the program and continue determining the lottery numbers by reading the next code set. The arrow 740 indicates the direction in which the laser light of the player moves over the section of layer 0 from the center to the outer edge of the optical article.

In FIG. 7 is also shown a section of an optical article 742. A 20 bit code is included on the optical article. The 20 bit code which would enable display of the numbers is included in SET A 744 having two opaque marks 746 covering bit codes A0 and A1 and three no marks or transparent marks 748 covering bit codes A2, A3 and A4, in SET B 750 having three opaque marks 752 covering bit codes B1, B2, and B4 and two no marks or transparent marks 754 covering bit codes B0 and B3, in SET C 756 having three opaque marks 758 covering bit codes C0 and C4 and two no marks or transparent marks 760 covering bit codes C1, C2 and C3, and in SET D 762 having four opaque marks 764 covering bit codes D1, D2, D3 and D4 and one two no mark or transparent mark 766 D0. In one embodiment, a bar code 768 may be printed for verification of the disc.

In the logical layout 700 shown in FIG. 7, when the disc is inserted 770 in a player, the player performs a FOAC pre-test 772 on the disc to determine if the button #1 is activated. If the Button #1 is not activated 674, the FOAC command fails and the failure message 776 included in the failure message region 716 pops up as a still message "this player does not support this DVD. Visit retailer or website to get 'lottery ticket numbers'". If the Button #1 is activated 778 the FOAC command works and the player moves forward and reads the advertisement 780. The player then checks the button SET A 782 and determines the state of functionality of the marks that cover the buttons in SET A and uses the FOAC commands to set the value of the GPRM registers for the five bits represented by the five buttons in SET A 784. For example, buttons A0 and A1 have an opaque mark GPRM1 bit 0 and bit 1 are both equal to 0, button A2 to A4 have no mark or a transparent mark GPRM1 bit 2, bit 3 and bit 4 are equal to 1, and the player determines the GPRM1 for SET A to be equal to 28 with GPRM1 values of (1,1,1,0,0) and subsequently shows a still message 786 "The number for slot A is" and a number '28' for example is displayed on the screen 788. The player then returns to play a portion of the advertisement or content in the disc. The player again moves on and checks the button SET B 790 and determines the state of functionality of the marks that cover the buttons in SET B and uses the FOAC commands to set the value of the GPRM registers for the five bits represented by the five buttons in SET B. For example, button B1, B2 and B4 have an have an opaque mark GPRM2 bit 1, bit 2, and bit 4 are all equal to 0, B0 and B3 have no mark or a transparent mark GPRM2 bit 0 and bit 3 are both equal to 1 and the player determines the GPRM2 for SET B 792 to be equal to 9 with GPRM2 values of (0,1,0,0,1) and subsequently shows a still message 794 "The number for slot B is" and a number '9' for example is displayed on the screen 796. The player then returns to play a portion of the advertisement or content in the disc. The player again moves on and checks the button SET C 798 and determines the state of functionality of the marks that cover the buttons in SET C and uses the FOAC commands to set the value of the GPRM registers for the five bits represented by the five buttons in SET C. For example, button C1, C2, and C3 have an have an opaque mark GPRM3 bit 1, bit 2, and bit 3 are all equal to 0, C0 and C4 have no mark or a transparent mark GPRM3 bit 0 and bit 4 are both equal to 1 and the player determines the GPRM3 for SET C 800 to be equal to 17 with GPRM3 values of (1,0,0,0,1) and subsequently shows a still message 802 "The number for slot C is" and a number '17' for example is displayed on the screen 804. The player then returns to play a portion of the advertisement or content in the disc. The player again moves on and checks the button SET D 806 and determines the state of functionality of the marks that cover the buttons in SET D and uses the FOAC commands to set the value of the GPRM registers for the five bits represented by the five buttons in SET D. For example, button D1, D2, D3 and D4 have an have an opaque mark GPRM4 bit 1, bit 2, bit 3, and bit 4 are all equal to 0, D0 has no mark or a transparent mark GPRM4 bit 0 is equal to 1 and the player determines the GPRM4 for SET D 808 to be equal to 1 with GPRM4 default values of (0,0,0,0,1) and subsequently shows a still message 810 "The number for slot D is" and a number '1' for example is displayed on the screen 812. The player then returns to play a portion of the advertisement or content in the disc or goes to the end of the disc.

Still yet another embodiment of the present disclosure is directed to a method of making an optical article for playback in a player. The method includes the steps of providing an optical article comprising a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic; wherein the first control logic is spaced at intervals in a data containing region of the optical article; wherein each first control logic is executed at intervals during the playback of a content in the optical article; and wherein the first control logic is executed as the optical article is read by a player; using a combination of the plurality of optically detectable marks in a pre-determined state associated with the first control logic.

Still yet another embodiment of the present disclosure is directed to a system for playback of an optical article in a player. The system includes an optical article comprising an optical article comprising a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic; wherein the first control logic is spaced at intervals in a data containing region of the optical article; wherein each first control logic is executed at intervals during the playback of a content in the optical article; and wherein the first control logic is executed as the optical article is read by a player; using a combination of the plurality of optically detectable marks in a pre-determined state associated with the first control logic.

Still yet another embodiment of the present disclosure is directed to a method for playback of an optical article in a player. The method includes the steps of providing an optical article comprising a plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a predetermined state; and wherein a customized player-readable code is determined using a combination of the plurality of optically detectable marks and their associated first control logic; wherein the first control logic is spaced at intervals in a data containing region of the optical article; wherein each first control logic is executed at intervals during the playback of a content in the optical article; and wherein the first control logic is executed as the optical article is read by a player; using a combination of the plurality of optically detectable marks in a pre-determined state associated with the first control logic.

Still yet another embodiment of the present disclosure is directed to a method for customizing an optical article for playback in a player. The method includes a step of disposing a plurality of optically detectable marks on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; and wherein a customized player-readable code is determined using a combination of the plurality of optically detectable marks and their associated first control logic; wherein the first control logic is spaced at intervals in a data containing region of the optical article; wherein each first control logic is executed at intervals during the playback of a content in the optical article; and wherein the first control logic is executed as the optical article is read by a player; using a combination of the plurality of optically detectable marks in a pre-determined state associated with the first control logic.

Still yet another embodiment of the present disclosure is directed to an optical article for playback in a player. The optical article includes a permanent player-readable code comprising a first set of a plurality of optically detectable marks disposed on the optical article; a second set of plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; wherein a customized player-readable code is determined using a combination of the plurality of optically detectable marks and their associated first control logic; and wherein the optical article is activated when the customized player-readable code is in a pre-determined relationship with the permanent code.

In one embodiment, the optical article may be modified to provide an enhanced security during POS-activation. In one embodiment, a permanent code may be included in the optical article and may be compared with a second code i.e., a customized player-readable code printed on the surface of the optical article. The first code is referred to as "permanent" because it is not intended to be modified at the point of sale or thereafter. The second code may be modified during activation at the point of sale. Both the codes. i.e., the permanent code and the customized player-readable code may be read by the player using a control logic, such as a forced activation FOAC button method which provides the FOAC commands.

The FOAC commands function to set or modify the GPRM registers in an optical article. For example, the disc can be authored in a manner that forces the player to check the permanent code and compare it to the customized player-readable code established from using a set of FOAC button commands that may covered by a plurality of optically detectable marks. The player at first may check if the marks are in a required combination of a first state of functionality and a second state of functionality. If the marks are in the required combination of a first state and a second state as determined by reading the FOAC commands, the player modifies the default value of a register. In one embodiment, if the permanent code matches the customized player-readable code, the optical article may be activated properly and access to the content is granted. If the permanent code does not match the activation code, the disc may have been stolen and hence the access to the content may be blocked.

In one embodiment, the optical article may be authored in such a manner that if an optical article is unprinted, the GPRM value for the permanent code and the GPRM for the customized player-readable code may be the same, thus rendering an unprinted disc functional.

In one embodiment, the permanent code may be disposed in the optical article during the initial manufacturing step of the optical article i.e., during the mastering/authoring step of the optical article. The "permanent code" as the name suggests is a code permanently disposed on the optical article and is a unique code used for a set of optical articles including a particular content.

In one embodiment, the first set of the plurality of optically detectable marks comprise marks comprising an optical state change material. In one embodiment, a mark of the first set of plurality of optically detectable marks is opaque in the first state and is transparent in the second state. In another embodiment, a mark of the first set of plurality of optically detectable marks is transparent in the first state and is opaque in the second state.

In one embodiment, the first set of plurality of optically detectable marks comprising an optical state change material is printed using a method selected from one or more of a screen-printing method, a ink-jet printing method, a direct write method, a pad printing method, a microarray deposition method, a capillary dispensing method, a gravure printing method, a thermal transfer printing method, and adhesion of pre-made polymer films.

In one embodiment, a mark of the first set of a plurality of optically detectable marks comprising an optical state change material is modified using one or more of a laser, a thermal energy, an electromagnetic radiation, a gamma ray, an acoustic wave, an electrical energy, a chemical energy, a magnetic energy, a mechanical energy, a radio frequency wave, and an ultraviolet radiation depending on the type of optical state change material included in the second set of the plurality of optically detectable marks.

In one embodiment, the first set of a plurality of optically detectable marks comprise static marks. The static marks are made in a similar manner as discussed above. In one embodiment, the first set of optically detectable marks is disposed on a surface of the optical article. In another embodiment, the permanent code is established through the introduction of parity mismatches during the encoding step. In various embodiments, the permanent code may be established i.e., encoded in the optical article during the encoding/mastering step of a master disc through the introduction of pre-mastered errors.

In one embodiment, the second set of the plurality of optically detectable marks comprise marks comprising an optical state change material. In one embodiment, a mark of the second set of plurality of optically detectable marks is opaque in the first state and is transparent in the second state. In another embodiment, a mark of the second set of plurality of optically detectable marks is transparent in the first state and is opaque in the second state. In one embodiment, the second set of plurality of optically detectable marks comprising an optical state change material is printed using a method selected from one or more of a screen-printing method, a ink-jet printing method, a direct write method, a pad printing method, a microarray deposition method, a capillary dispensing method, a gravure printing method, a thermal transfer printing method, and adhesion of pre-made polymer films. In one embodiment, a mark of the second set of a plurality of optically detectable marks comprising an optical state change material is modified using one or more of a laser, a thermal energy, an electromagnetic radiation, a gamma ray, an acoustic wave, an electrical energy, a chemical energy, a magnetic energy, a mechanical energy, a radio frequency wave, and an ultraviolet radiation depending on the type of optical state change material included in the second set of the plurality of optically detectable marks. In one embodiment, the second set of a plurality of optically detectable marks comprise static marks.

In one embodiment, the second set of a plurality of optically detectable marks is disposed on a surface of the optical article on a data containing region of the optical article. In one embodiment, the second set of a plurality of optically detectable marks is disposed on the outermost surface of the optical article on a data containing region of the optical article. In another embodiment, during the packaging process, an activation tag programmed with the proper combination of marks in a first state and second state may be placed on the surface of the optical article to form the second set of plurality of optically detectable marks. The desired pattern in which the state of functionality of the marks is modified may be controlled by the tag in combination with an activation device. Thus the permanent code is a fixed code and the customized player-readable code may be variable code. Various activation profiles may be needed to activate the customized player-readable code in a manner such that the activated customized player-readable code is in a pre-determined relationship the permanent code and the disc is rendered playable. Thus, a complicated multi-step production process for varying activation codes on different optical articles can be reduced to a single print/packaging step combined with an activation device configured to execute a pre-determined activation, utilizing this methodology.

As mentioned above, one embodiment, the marks for the permanent code may be deposited on any surface of the optical article. In various embodiments, the marks for the permanent code may be deposited inside the structure of the optical article. In optical storage articles, the marks for the permanent code may be deposited in the substrate on which the optical data layer is deposited. In alternate embodiments, the marks for the permanent code may be deposited between the layers of the optical article, or may be deposited within a layer of the optical article. For example, the ink composition may be incorporated in the UV curable adhesive of the bonding (spacer) layer. In this case it should be appreciated that these marks should be thermally stable to withstand the manufacturing temperatures of the optical article. Also, these marks may preferably absorb the wavelength of the laser light in one of the activated, or the pre-activated state of the mark. Upon interaction with external stimulus, the mark present inside the substrate changes color. As a result, the substrate may become transparent to the laser light, thereby facilitating the transmittance of laser light through the substrate and making the data in the region of the mark readable.

Another embodiment of the present disclosure is directed to a method of making an optical article for playback in a player. The method includes the steps of providing an optical article comprising a permanent player-readable code comprising a first set of a plurality of optically detectable marks disposed on the optical article; a second set of plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; wherein a customized player-readable code is determined using a combination of the plurality of optically detectable marks and their associated first control logic; and wherein the optical article is activated when the customized player-readable code is in a pre-determined relationship with the permanent code.

Yet another embodiment of the present disclosure is directed to a system for playback of an optical article in a player. The system includes an optical article including an optical article comprising a permanent player-readable code comprising a first set of a plurality of optically detectable marks disposed on the optical article; a second set of plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; wherein a customized player-readable code is determined using a combination of the plurality of optically detectable marks and their associated first control logic; and wherein the optical article is activated when the customized player-readable code is in a pre-determined relationship with the permanent code.

Still yet another embodiment of the present disclosure is directed to a method for playback of an optical article in a player. The method includes the steps of providing an optical article comprising a permanent player-readable code comprising a first set of a plurality of optically detectable marks disposed on the optical article; a second set of plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; wherein a customized player-readable code is determined using a combination of the plurality of optically detectable marks and their associated first control logic; and wherein the optical article is activated when the customized player-readable code is in a pre-determined relationship with the permanent code.

Figure 2:
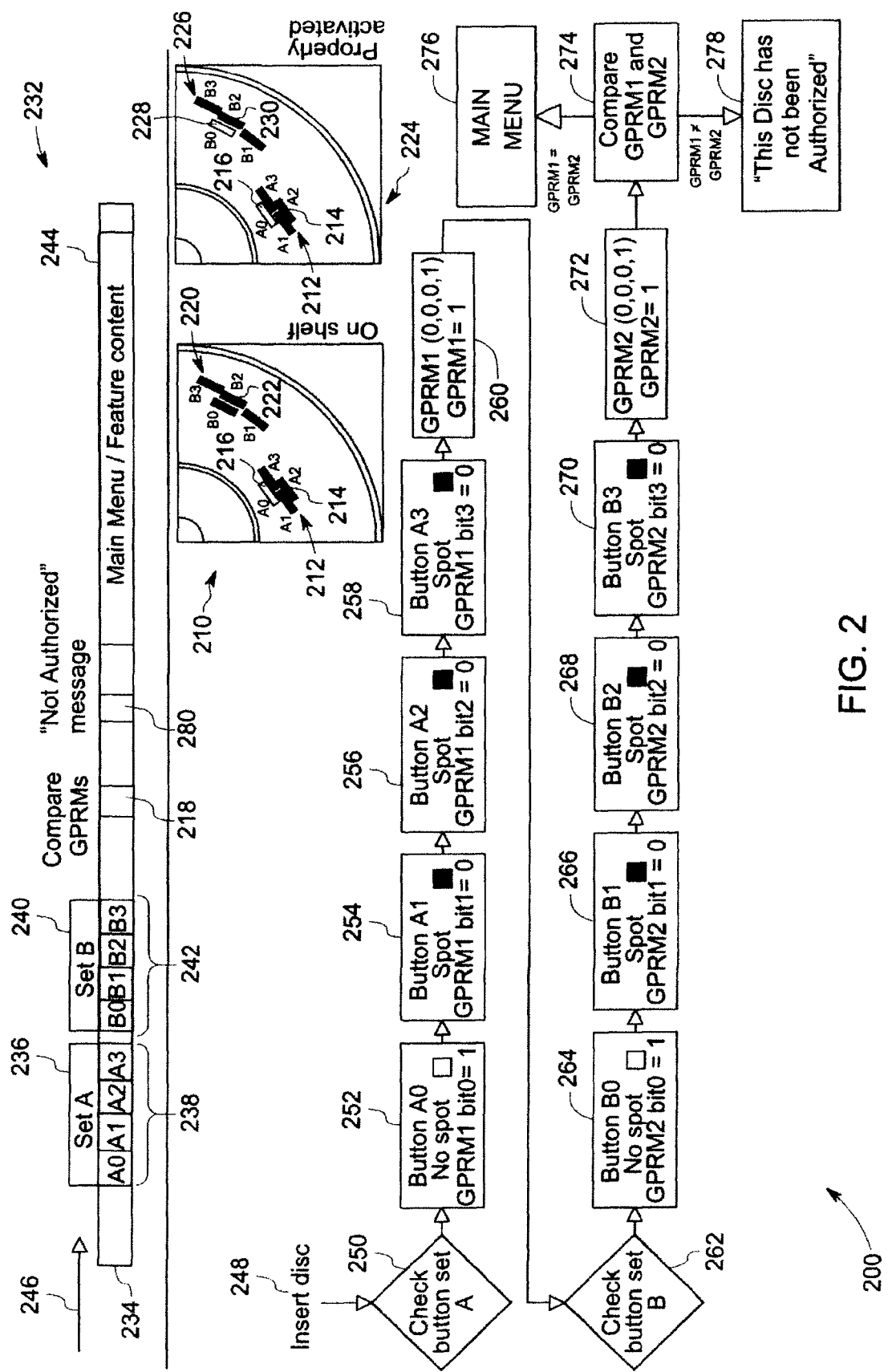
FIG. 2 shows a logical layout of an optical article in accordance with an exemplary embodiment described herein.

Referring to FIG. 2 a logical layout of content 200 in an optical article is provided. In FIG. 2 is also shown a section of an optical article before activation 210 and a section of an optical article after activation 224. When the optical article is manufactured, a set of permanent codes (4 bit codes) 212 having three opaque marks 214 covering bit codes A1, A2 and A3 and one transparent mark 216 covering bit code A0 is printed on or encoded in the optical article along with a set of customized player-readable codes (4 bit codes) 220 having four opaque marks 222 covering bit codes B0, B1, B2 and B3 which is printed on the surface of the optical article. When the optical article is activated, the set of permanent codes 212 do not get modified. However, the activation device used to activate the optical article may be programmed to modify the customized player-readable codes 220 to provide a modified customized player-readable code 226 having three opaque marks 230 covering bit codes B1, B2 and B3 and one transparent mark 228 covering bit code B0 that correspond to the opaque and transparent marks of the permanent code.

In FIG. 2 is also provided a section 232 of layer 0 234 of an optical article DVD9 or single layer of a DVD5. The layer indicates a permanent code 236 including a SET A of 4 bit codes 238 (A0, A1, A2, and A3) and a customized player-readable code 240 including a SET B of 4 bit codes 242 (B0, B1, B2, and B3). The layer 0 also includes a sector 218 that includes the control logic to compare the GPRMs, a sector 280 that includes the control logic to display the "Not Authorized" message, and a sector 244 containing the main menu and feature content. The arrow 246 indicates the direction in which the laser light of the player moves over the section of layer 0 from the center to the outer edge of the optical article.

The optical article may be activated at a point of sale resulting in the modification of the customized player-readable code printed on the surface of the optical article. The process of comparing the permanent code and the customized player-readable codes includes inserting an activated optical article 248 in a player. The player then checks the button SET A 250 and determines the state of functionality of the marks that cover the buttons in SET A and by reading the FOAC commands to set the value of the GPRM registers for the four bits represented by the four buttons in SET A. If a mark is transparent, the FOAC command will be properly read and the bit will be changed from the default value of 0 to the modified value of 1. If the mark is opaque, the FOAC command will not be read properly and the bit will remain at its default value of 0. For example, button A0 has no mark or a transparent mark and thus GPRM1 bit 0 is equal to 1 252, button A1 has an opaque mark and thus GPRM1 bit 1 is equal to 0 254, button A2 has an opaque mark and thus GPRM1 bit 2 is equal to 0 256, and button A3 has an opaque mark and thus GPRM1 bit 3 is equal to 0 258. The player calculates the GPRM1 for SET A to be equal to 1 with GPRM1 values of (0,0,0,1) 260. The player then checks the button SET B 262 and determines the state of functionality of the marks that cover the buttons in SET B and uses the FOAC commands to set the value of the GPRM registers for the four bits represented by the four buttons in SET B. If a mark is transparent, the FOAC command will be properly read and the bit will be changed from the default value of 0 to the modified value of 1. If the mark is opaque, the FOAC command will not be read properly and the bit will remain at its default value of 0. For example, button B0 has no mark or a transparent mark and thus GPRM2 bit 0 is equal to 1 264, button B1 has an opaque mark and thus GPRM2 bit 1 is equal to 0 266, button B2 has an opaque mark and thus GPRM2 bit 2 is equal to 0 268, and button B3 has an opaque mark and thus GPRM2 bit 3 is equal to 0 270. The player determines the GPRM2 for SET B 272 to be equal to 1 with GPRM2 values of (0,0,0,1). The player now compares 274 GPRM1 and GPRM2 values. In this case, the disc is authored so that in an event when GPRM1 is equal to GPRM2 the player can access 276 the Main Menu. In this case, for an event when GPRM1 is not equal to GPRM 2 the player is blocked 278 from accessing the disc implying that the optical article has not been authorized. In this case the player is directed to the "This Disc has not been Authorized" still and the player functions are disabled, ending the playback of the disc in a dead end. The permanent code A and customizable code B may be related by an arbitrary hash function to allow access to the feature content. In the above example, the hash function used is the simplest A=B to allow access.

Figure 3:
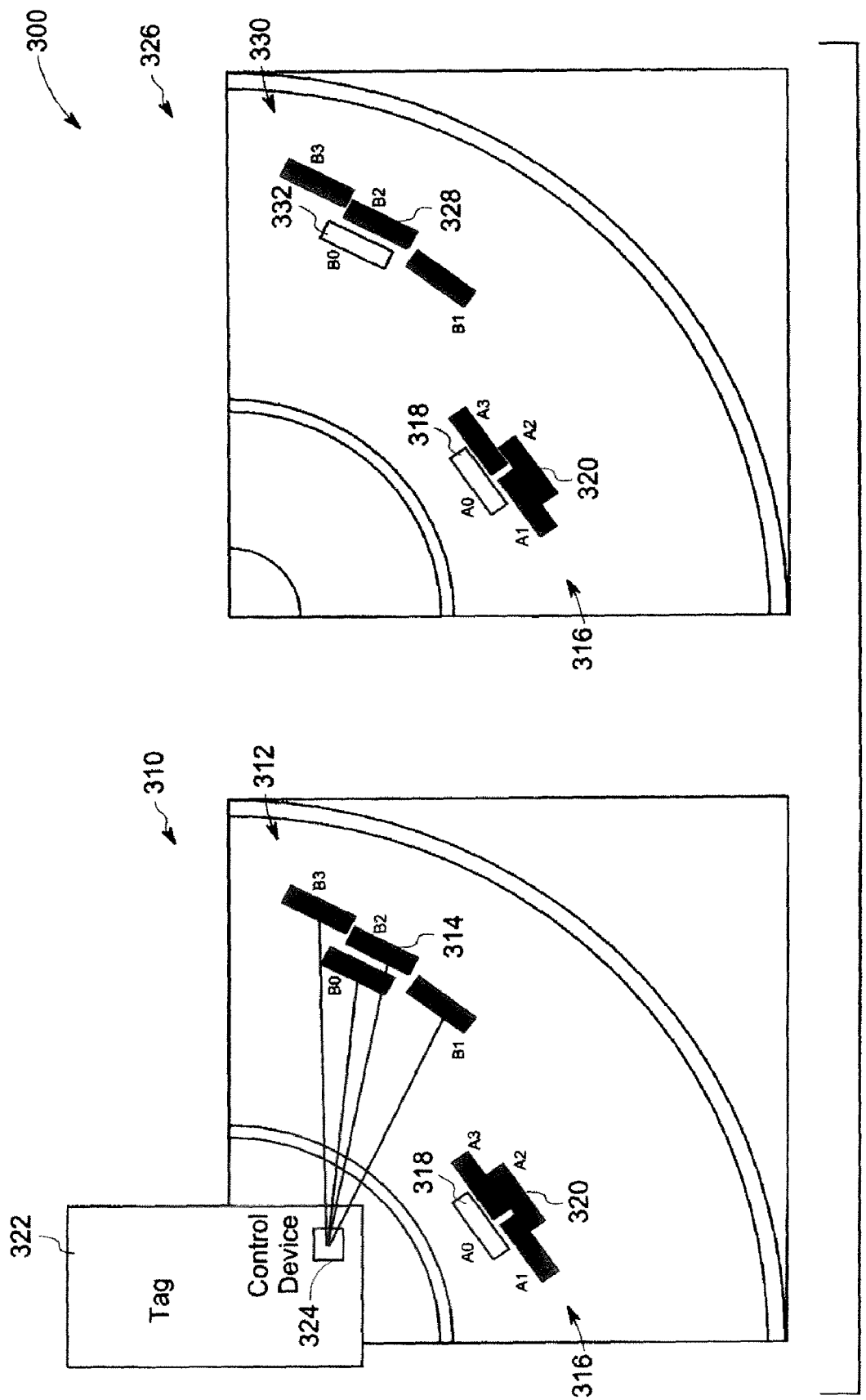
FIG. 3 shows a customized player-readable code printed on an optical article in accordance with an embodiment disclosed herein.

Referring to FIG. 3, a section of an optical article 300 shows the section of the optical article in first state 310 i.e., a pre-activated state and the section of the optical article in a second state 326 i.e., an activated state. In the first state the optical article shows a set of permanent marks 316 having three opaque marks 320 covering bit codes A1, A2, and A3 and one no mark or transparent mark 318 covering bit code A0. In the first state the article also shows a set of customized player-readable codes 314 having four opaque marks 314 covering bit codes B0, B1, B2 and B3. A tag 322 having a chip or equivalent programming mechanism or control device 324 is operatively coupled with the optical article. One skilled in the art may employ any suitable method to activate the optical article using the tag. On activation the optical article moves to a second state 326. In the second state 326 the optical article shows a set of permanent marks 316 having three opaque marks 320 and one no mark or transparent mark 318. In the second state the optical article shows a set of customized player-readable codes 328 having three opaque marks 330 and one no mark or transparent mark 332 and this combination matches with the permanent marks, thus rendering the optical article playable.

One skilled in the art may envision any number of mark patterns, up to 16 bits per GPRM, with any number of code subsets to be compared with each other (up to 16 GPRMs). It is known that the likelihood of a successful activation may go down by a factor of 2 for each mark that is added to the codes, since the number of combinations in a binary code will go as $2^{(number\ of\ bits)}$. Thus increase in the number marks may result in increased security. However, a tradeoff between increased security and number of marks may need to be determined, because having multiple marks results in a disadvantage of adding an additional time at disc startup to check the status of each mark, and also sacrificing space on the disc for the space taken up by the corresponding control logic.

In one embodiment, the marks for each button may be near the same physical location. In another embodiment, the order of individual bits contained in each button may be scrambled among the button sets and around the disc and the marks may cover these scrambled bits. As discussed above, the player would check all buttons then make the appropriate GPRM comparisons. In various embodiments, it should be noted that a cursory examination of the disc may not reveal any information as to how many bits are activated in the permanent code and thus it will not be trivial to see what marks need to be activated in the activation code (i.e., in the figure it is easy to see which mark in set A is light and which corresponding mark we need to activate in SET B.) In one embodiment, scrambling the marks over the surface of the optical article may help minimize the ease of determination and hence the ease of activation. As mentioned previously, the two codes may be related by an arbitrary hash function to further enhance the security.

The "permanent code" methodology for security may provide a number of advantages over the prior art. One advantage, as discussed above, may be that with the same master, the permanent code may be easily varied by changing the print pattern. This can make for a very wide variety of customized player-readable codes that may be necessary to activate the disc. Thus, for the same master optical article there may be many mark-combinations required to obtain a successful activation. Also, there may make publication of a single code for activation by hackers useless, and a simple examination of an activated disc may not allow a thief to easily activate a stolen disc.

Another advantage may be in that the security and activation codes are imprinted on the optical article itself using a universal programming that may allow for validation and playback using any player on the marketplace. Thus the player alone can validate and play back the disc without needing to access any sort of external network to determine access privileges. Yet another advantage would be that an unprinted disc may remain functional to allow sales to the rental markets without making any changes to the authoring, mastering, or replication workflows. The discs simply needs to be diverted before the printing/packaging step, which is already done for these markets.

Still yet another embodiment of the present disclosure is directed to an optical article for playback in a player. The optical article includes a permanent player-readable code comprising a first set of a plurality of optically detectable marks disposed on the optical article; a second set of plurality of optically detectable marks disposed on a surface of the optical article; a third set of plurality of optically detectable marks disposed on a surface of the optical article; wherein the plurality of optically detectable marks are in a pre-determined combination of a first state and a second state; and at least one first control logic comprising at least one sector; wherein each optically detectable mark is associated with a particular first control logic; wherein each first control logic is executed only when its associated optically detectable mark is in a pre-determined state; wherein a first customized player-readable code is determined using a combination of the second set of plurality of optically detectable marks and their associated first control logic; wherein a second customized player-readable code is determined using a combination of the third set of plurality of optically detectable marks and their associated first control logic; wherein the optical article is activated when the customized player-readable code is in a pre-determined relationship with the permanent code; wherein there are a multiple of pre-determined relationships between the customized player-readable code and the permanent code based on the pre-determined states of the first set, the second set, and the third set of the plurality of optically detectable marks; wherein the optical article is in a pre-activated state wherein a first set of customized player-readable code is not in the pre-determined relationship with the permanent code; wherein upon activation the optical article is in a first activated state wherein the first set of customized player-readable code is adjusted to a first pre-determined relationship with the permanent code; wherein the optical article is deactivated to a deactivated state when the first set of customized player-readable code is adjusted to a state that is not in the pre-determined relationship with the permanent code; and wherein the optical article is reactivated to a second activated state wherein a second set of customized player-readable code is adjusted to a second pre-determined relationship with the permanent code.

In one embodiment, a disc may be deactivated upon return to the store, and re-activated when the disc is re-purchased. In one embodiment, an optical article including one set of permanent codes and a plurality of customized player-readable codes may be generated. In one embodiment, it may be possible to re-activate the optical article. As discussed above the optical article may be activated by setting the GPRM registers using a combination of the customized player-readable codes printed on the optical article and the FOAC commands included in the discs to read the control logic. When the optical article is first purchased by a first user a first set of customized player-readable codes is activated at the POS such that the resultant code matches the permanent code, thus rendering the optical article active for the first time. When the first user returns the optical article at the point of return POS the first set of customized player-readable codes is de-activated such that the resultant code does not match the permanent code and the optical article is rendered unplayable. When a second user purchases the optical article a second set of customized player-readable codes is activated at the POS such that the resultant code matches the permanent code, thus rendering the optical article active for a second time. This cycle may be repeated based on a number of practically possible customized player-readable codes that can be printed on the optical article.

Figure 4:
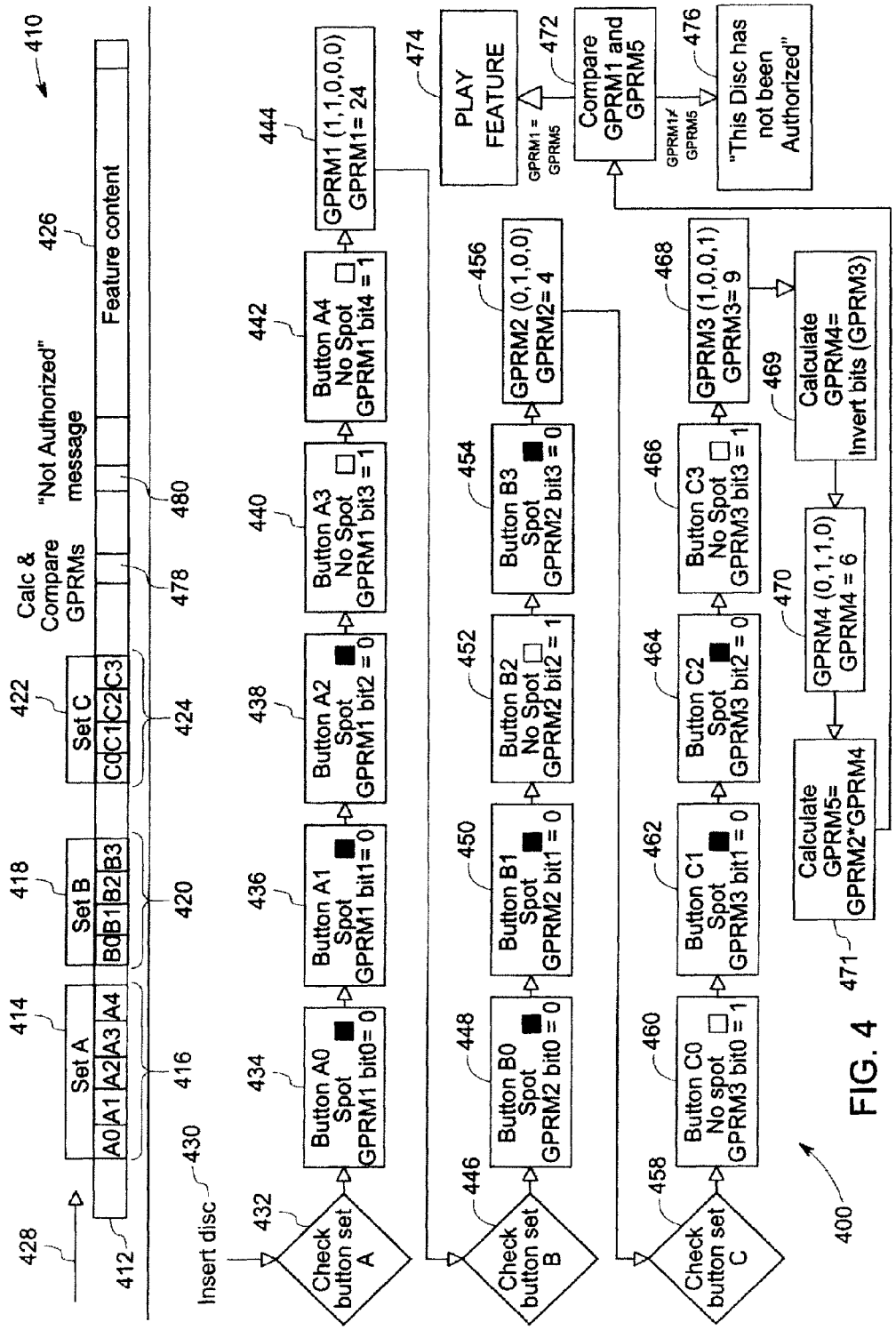
FIG. 4 shows a logical layout of an optical article in accordance with an exemplary embodiment described herein.

Referring to FIG. 4, a logical layout of content 400 in an optical article is provided. In FIG. 4 is also provided a section 410 of layer 0 412 of an optical article DVD9 or single layer of a DVD5. The layer indicates a permanent code 414 including a SET A of 5 bit codes 416 (A0, A1, A2, A3, and A4), a first set of customized player-readable code 418 including a SET B of 4 bit codes 420 (B0, B1, B2, and B3), and a second set of customized player-readable code 422 including SET C of 4 bit codes 424 (C0, C1, C2, and C3). The layer 0 also includes a sector 426 containing the main menu and feature content. The layer 0 includes a sector containing the control logic for calculating and comparing the GPRMs 478 and a sector for displaying the "Not Authorized" message 480. The arrow 428 indicates the direction in which the laser light of the player moves over the section of layer 0 from the center to the outer edge of the optical article.

The optical article may be activated at a point of sale resulting in modification of the customized player-readable codes printed on the surface of the optical article. The process of comparing the permanent code and the customized player-readable codes includes inserting an activated optical article 430 in a player. The player then checks the button SET A 432 and determines the state of functionality of the marks that cover the buttons in SET A by executing the FOAC commands to set the value of the GPRM registers for the five bits represented by the five buttons in SET A. If a mark is transparent, the FOAC command will be properly read and the bit will be changed from the default value of 0 to the modified value of 1. If the mark is opaque, the FOAC command will not be read properly and the bit will remain at its default value of 0. For example, button A0 has an opaque mark and thus GPRM1 bit 0 is equal to 0 434, button A1 has an opaque mark and thus GPRM1 bit 1 is equal to 0 436, button A2 has an opaque mark and thus GPRM1 bit 2 is equal to 0 438, button A3 has no mark or a transparent mark and thus GPRM1 bit 3 is equal to 1 440, and button A4 has no mark or a transparent mark and thus GPRM1 bit 4 is equal to 1 442. The player determines the GPRM1 for SET A 444 to be equal to 24 with GPRM1 values of (1,1,0,0,0). The player then checks the button SET B 446 and determines the state of functionality of the marks that cover the buttons in SET B and executes the FOAC commands to set the value of the GPRM registers for the four bits represented by the four buttons in SET B. If a mark is transparent, the FOAC command will be properly read and the bit will be changed from the default value of 0 to the modified value of 1. If the mark is opaque, the FOAC command will not be read properly and the bit will remain at its default value of 0. For example, button B0 has an opaque mark and thus GPRM2 bit 0 is equal to 0 448, button B1 has an opaque mark and thus GPRM2 bit 1 is equal to 0 450, button B2 has no mark or a transparent mark and thus GPRM2 bit 2 is equal to 1 452, and button B3 has an opaque mark GPRM2 bit 3 is equal to 0 454. The player determines the GPRM2 for SET B 456 to be equal to 4 with GPRM2 values of (0,1,0,0). The player then checks the button SET C 458 and determines the state of functionality of the marks that cover the buttons in SET C by executing the FOAC commands to set the value of the GPRM registers for the four bits represented by the four buttons in SET C. If a mark is transparent, the FOAC command will be properly read and the bit will be changed from the default value of 0 to the modified value of 1. If the mark is opaque, the FOAC command will not be read properly and the bit will remain at its default value of 0. For example, button C0 has no mark or a transparent mark GPRM2 bit 0 is equal to 1 460, button C1 has an opaque mark GPRM2 bit 1 is equal to 0 462, button C2 has an opaque mark GPRM2 bit 2 is equal to 0 464, and button C3 has no mark or a transparent mark GPRM2 bit 3 is equal to 1 466. The player determines the GPRM3 for SET C 468 to be equal to 9 with GPRM3 values of (1,0,0,1). The player now directed to calculate a GPRM4 value 469 by inverting the bits of GPRM3. The result of this operation is GPRM4=(0,1,1,0)=6 470. The player is then directed to calculate a GPRM5 value 471 by multiplying the values of GPRM2 and GPRM4, and then compares 472 the GPRM1 value and the GPRM5 values. In this case, the disc is programmed such that in an event when GPRM1 is equal to GPRM5 the player can access 474 the Main Menu. In an event when GPRM1 is not equal to GPRM5 the player is blocked 476 from accessing the disc implying that the optical article has not been authorized. In this case the player is directed to the "This Disc has not been Authorized" still and the player functions are disabled, ending the playback of the disc in a dead end. The disc can be programmed to grant access to the feature article when GPRM1 and GPRM5 are related by an arbitrary hash function.

Figure 5:
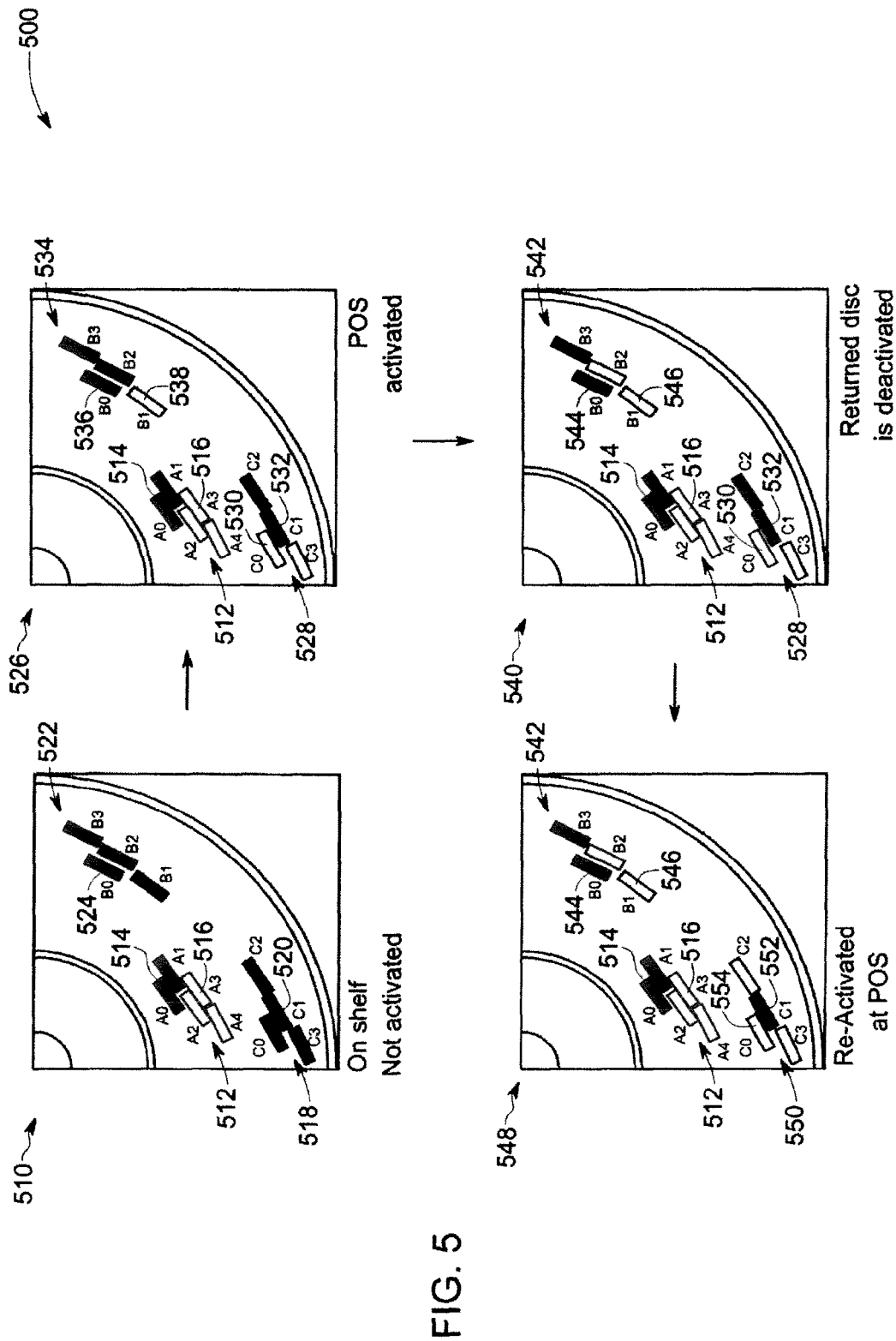
FIG. 5 shows a customized player-readable code printed on an optical article and an activation and re-activation method of the optical article in accordance with an exemplary embodiment described herein.

Referring to FIG. 5 a section of an optical article 500 before activation 510 and after activation 526 is provided. When the optical article is manufactured, a set of permanent codes SET A (5 bit codes) 512 having two opaque marks 514 covering bit codes A3 and A4 and three transparent marks 516 covering bit codes A0, A1 and A2 is printed on or encoded in the optical article. In certain embodiments where the transparent marks are desired no marks may be printed or in some embodiments an opaque mark may be printed and transformed to a transparent mark by using an activation signal. Two sets of customized player-readable codes (4 bit codes) are also printed on the surface of the optical article. The first set SET B 522 having four opaque marks 524 covering bit codes B0, B1, B2, and B3 and a second SET C 518 having four opaque marks 520 covering bit codes C0, C1, C2, and C3. The optical article may be activated more than one time, for example in this instance the optical article may be activated at least two times. When the optical article is activated, the set of permanent codes 512 do not get modified. However, accordingly the activation device used to activate the optical article may be programmed to modify the customized player-readable codes of SET B 522 to provide a modified SET B 534 having three opaque marks 536 covering bit codes B0, B1, and B3 and one transparent mark 538 covering bit code B2 and the customized player-readable codes of SET C 518 to provide a modified SET C 528 having two opaque marks 532 covering bit codes C1 and C2 and two transparent marks 538 covering bit codes C0 and C3. The GPRM values for SET A GPRM1 is 24, for SET B GPRM2 is 0 and for SET C GPRM3 is 0 in the unactivated disc 510 GPRM3 will be used to calculate GPRM4 through bit inversion, and GRPM4 will thus have a value of 15 in the unactivated disc. The disc is then subjected to a first activation step. This results in a modification in the values of the GPRM registers to: for SET A GPRM1 is 24, for SET B GPRM2 is 4 and for SET C GPRM3 is 9, which is converted by inverting the bits to a GPRM4 value of 6. The content in the disc is now accessible to the player since the value calculated by multiplying GPRM2 and GPRM4 i.e. 6×4, is equal to 24 which is equal to the value of GPRM1. Once the disc is returned to the shop or vendor the disc can be deactivated by modifying the customized player-readable codes and hence modifying the GPRM values. For example, once the activated disc 526 is returned it is deactivated 540 by changing the state of functionality of one of the marks in SET B 534 as shown in activated disc 526. In the deactivated disc 540 SET B 542 has two bits covered with opaque marks 544 covering bit codes B0 and B3 and two bits covered with no mark or a transparent mark 546 covering bit codes B1 and B2 as a result of which the GPRM 2 value is modified to 6. The content in the disc is now not accessible to the player since the value calculated by multiplying GPRM2 and GPRM4 i.e. 6×6, is equal to 36 which is not equal to the value of GPRM1. The disc 540 may be reactivated for a new user by changing the state of functionality of one of the marks in SET C. In the deactivated disc 540 SET C 528 has two bits covered by opaque marks 532 covering bit codes C1 and C2 and two bits covered by no mark or a transparent mark 530 covering bit codes C0 and C3. When the disc 540 is reactivated in the reactivated disc 548 SET C 550 has one bit C2 covered with an opaque mark 552 and three bits covered with no mark or a transparent mark 554 covering bit codes C0, C1 and C3 as a result of which the GPRM3 value is modified to (1,0,1,1) or a value of 11. GPRM4 is calculated by inverting the bits on GPRM3 and the results is (0,1,0,0) which gives a value of 4. The content in the disc is now accessible to the player/second user since the value calculated by multiplying GPRM2 and GPRM4 i.e. 6×4, is equal to 24 which is equal to the value of GPRM1. In one embodiment, the tag may need to be programmed to determine the state of functionality of the marks on the disc and hence the state of the disc, and will accordingly deactivate and subsequently activate a disc using the logical layout indicated in FIG. 4.

In one embodiment, since an unprinted disc can be functional, care must be taken as in how the "permanent code" is printed on the disc to prevent a thief from simply washing all of the marks or markings off of the disc which may result in getting the disc activated. In one embodiment, the permanent code may be imprinted on the disc using unbleachable marks; however, these marks may be washed off easily. In one embodiment, the printed disc may be protected by a hardcoat to prevent washing or minimize ease of washing off the marks.

In one embodiment, a method to permanently mark the disc and prevent access to the sectors authored for FOAC may be employed. As an alternative to using printed marks that bleach, the tag could instead permanently mark the variable code on the disc through heating/dimpling, thermal state changes of printed materials that do not contain dyes, etc. The disc may be marked permanently using one or methods selected from altering the readability through the polycarbonate layer through solvent marking (using a solvent that attacks the polycarbonate surface), damaging small portions of the reflective layer using a high powered laser (laser marking), and damaging the surface of the disc using heat (heat dimpling). Each of these methods could be used on a very small area of the disc to prevent the player from reading the sectors that have the forced activation commands for the bits in the GPRM registers, rendering the rest of the disc perfectly readable. Further, the mark patterns or markings could be combined with pre-mastered errors on the disc to reduce the size of the mark or mark required to obscure the command to change a specified bit in a GPRM.

In various other embodiments, a customized player-readable code may be used to enable more advanced versions of digital rights management (DRM) i.e., schemes intended to make the content more secure. In a DRM scheme, the content on the DVD-video disc is locked. The content is made accessible (opened) only when the user enters a specific serial number via the keypad of a remote control operatively coupled with the DVD into a special menu on the DVD. The serial numbers are generated by a specific algorithm based on a control key that is stored (authored) in the DVD. The customer would receive the key to input when the disc is purchased, or when they give a credit card number to an operator on the phone. This key may unlock the entire disc or could unlock certain areas in the disc, etc. The weakness of this strategy is that, when the unlock key is given to one consumer, this may be shared (via internet, for example) such that future customers may not need to make the purchase to unlock the disc. Only a single code, or limited numbers of multiple codes are used because to author a new code on a disc, a new version must be authored and re-mastered, which is very expensive. In one embodiment, by employing the customized player-readable code an individualized serial number may be burned or printed individual DVDs and thus the code will vary from disc-to-disc. If a code is given out at purchase it will not be applicable to a different disc. The customizable code for DRM is inexpensive and easy because it is implemented at the end of the DVD production process, thus eliminating the need for re-authoring and re-mastering to change the control key. Thus, the customizable code offers a tremendous advantage over the current DRM scheme.

In another embodiment, a customized player-readable code may be used to help prevent theft of the content distributed on DVDs. The way this would work is that a legitimate (original) DVD would have its content inaccessible in a manner as described above i.e., the content plays only when a specific customized player-readable code is stored on the disc. Illegitimately copied discs i.e., discs prepared by ripping DVDs and burning onto other recordable media would lack the customized player-readable code that is present on the original disc and therefore may not be readable by a player.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical article for playback in a player comprising:
   a plurality of optically detectable marks disposed on a surface of the optical article; wherein the plurality of optically detectable marks are in a pre-determined combination of a first state and a second state; and
   at least one first control logic comprising at least one sector;
   wherein each optically detectable mark is associated with a particular first control logic;
   wherein each first control logic is executed only when its associated optically detectable mark is in a pre-determined state; and
   wherein a customized player-readable code is determined using a combination of the plurality of optically detectable marks and their associated first control logic.

2. The optical article of claim 1, wherein the customized player-readable code is determined using a second control logic, wherein the second control logic is configured to set the value of a first register by using a combination of the optically detectable mark in a pre-determined state and their associated first control logic.

3. The optical article of claim 2, wherein the second control logic sets the value of the first register based on the combined states of the plurality of optically detectable marks.

4. The optical article of claim 2, wherein the second control logic sets the value of the first register based on the combined states of a part of the plurality of optically detectable marks.

5. The optical article of claim 1, wherein for each bit of the customized player-readable code a player is directed to set the non-default value of the register using a forced activation method, wherein the register has a default value before it is set and a non-default value after it is set.

6. The optical article of claim 1, wherein the customized player-readable code provides a default version of playback of a content in a pre-determined configuration.

7. The optical article of claim 6, wherein the customized player-readable code provides a default language track to be used during playback.

8. The optical article of claim 6, wherein the customized player-readable code provides advertisements customized to retailer demographics during playback.

9. The optical article of claim 6, wherein the customized player-readable code provides advertisements customized to a retailer during playback.

10. The optical article of claim 6, wherein the customized player-readable code provides advertisements customized to geographical locations during playback.

11. The optical article of claim 6, wherein the customized player-readable code provides in-DVD product placements customized to retailer during playback.

12. The optical article of claim 6, wherein the customized player-readable code provides play of special features customized to retailer during playback.

13. The optical article of claim 6, wherein the customized player-readable code provides a selection of one or more of a language, a scene, a parental setting, an audio track, and a sub-title during playback.

14. The optical article of claim 1, wherein the customized player-readable code provides a serialized identification number of the optical article.

15. The optical article of claim 1, wherein the first control logic is spaced at intervals in a data containing region of the optical article; and wherein the first control logic is executed as the optical article is read by a player; using a combination of the plurality of optically detectable marks in a pre-determined state associated with the first control logic.

16. The optical article of claim 1, wherein the plurality of optically detectable marks comprise an optical state change material.

17. The optical article of claim 16, wherein a mark of the plurality of optically detectable marks is opaque in the first state and is transparent in the second state.

18. The optical article of claim 16, wherein a mark of the plurality of optically detectable marks is transparent in the first state and is opaque in the second state.

19. The optical article of claim 16, wherein the optically detectable marks are printed using a method selected from one or more of a screen-printing method, a ink-jet printing method, a direct write method, a pad printing method, a microarray deposition method, a capillary dispensing method, a gravure printing method, a thermal transfer printing method, and adhesion of pre-made polymer films.

20. The optical article of claim 16, wherein the optically detectable marks is disposed on a surface of the optical article on a data containing region of the optical article.

21. The optical article of claim 16, wherein the state of a mark of the plurality of the marks comprising the optical state change material is modified using one or more of a laser, a thermal energy, an electromagnetic radiation, a gamma ray, an acoustic wave, an electrical energy, a chemical energy, a magnetic energy, a mechanical energy, a radio frequency wave, and an ultraviolet radiation depending on the type of optical state change material included in the plurality of optically detectable marks.

22. The optical article of claim 1, wherein the optically detectable marks comprise static marks.

23. The optical article of claim 1, wherein the optical article comprises one of a CD, a DVD, a HD-DVD, a blu-ray disc, a near field optical storage disc, a holographic storage medium, another like volumetric optical storage medium, an identification card, a passport, a payment card, a driving license, or a personal information card.

24. A method for customizing an optical article for playback in a player comprising:
   providing an optical article comprising a plurality of optically detectable marks disposed on a surface of the optical article; wherein the plurality of optically detectable marks are in a pre-determined combination of a first state and a second state;
   providing at least one first control logic comprising at least one sector on the optical article;
   wherein each optically detectable mark is associated with a particular first control logic;
   wherein each first control logic is executed only when its associated optically detectable mark is in a pre-determined state; and
   wherein a customized player-readable code is determined using a combination of the plurality of optically detectable marks and their associated first control logic.

25. The method of claim 24, further comprising a step of providing a second control logic, wherein the second control logic is configured to set the value of a first register by using a combination of the optically detectable mark in a pre-determined state and their associated first control logic.

26. The method of claim 24, wherein the optically detectable marks comprise marks comprising an optical state change material.

27. The method of claim 26, wherein the plurality of optically detectable marks are disposed on the optical article by printing the plurality of the optically detectable marks comprising the optical state change material on a surface of the optical article on a data containing region of the optical article.

28. The method of claim 27, wherein the state of a mark of the plurality of the marks comprising the optical state change material is modified using one or more of a laser, a thermal energy, an electromagnetic radiation, a gamma ray, an acoustic wave, an electrical energy, a chemical energy, a magnetic energy, a mechanical energy, a radio frequency wave, and an ultraviolet radiation depending on the type of optical state change material included in the plurality of optically detectable marks.

29. The method of claim 28, wherein the optically detectable marks comprise static marks.

30. The method of claim 29, wherein the static marks are made by distorting the surface of the optical article using an irreversible print method such as a solvent that permanently clouds the optical article, a powerful laser that marks the reflective layer of the disc, or a small heater that distorts the readout surface of the optical article.

31. A system for playback of an optical article in a player comprising:
   an optical article comprising a plurality of optically detectable marks disposed on a surface of the optical article; wherein the plurality of optically detectable marks are in a pre-determined combination of a first state and a second state; and
   the optical article comprising at least one first control logic comprising at least one sector;
   wherein each optically detectable mark is associated with a particular first control logic;
   wherein each first control logic is executed only when its associated optically detectable mark is in a pre-determined state; and
   wherein a customized player-readable code is determined using a combination of the plurality of optically detectable marks and their associated first control logic.

32. The system of claim 31, wherein the optically detectable marks comprise marks comprising an optical state change material.

33. The system of claim 31, comprising an activation device programmed to effect a change in a state of the plurality of optically detectable marks.

34. The system of claim 31, wherein the optically detectable marks comprise static marks.

35. The system of claim 31, further comprising a player; wherein for each bit of the customized player-readable code the player is directed to set the non-default value of the register using a forced activation method, wherein the register has a default value before it is set and a non-default value after it is set.

36. A method for playback of an optical article in a player comprising:
   providing an optical article comprising a plurality of optically detectable marks disposed on a surface of the optical article; wherein the plurality of optically detectable marks are in a pre-determined combination of a first state and a second state; wherein the optical article comprises at least one first control logic comprising at least one sector on the optical article;
   wherein each optically detectable mark is associated with a particular first control logic;
   wherein each first control logic is executed only when its associated optically detectable mark is in a pre-determined state; and
   wherein a customized player-readable code is determined using a combination of the plurality of optically detectable marks and their associated first control logic.

37. The method of claim 36, further comprising a step of modifying the optical article to effect a change in a state of the plurality of optically detectable marks; wherein the optically detectable marks comprise an optical state change material.

38. The method of claim 36, further comprising a step of modifying the optical article to effect the formation of static marks on the surface of the optical article.

39. A method for making an optical article for playback in a player comprising:
   providing an optical article comprising a plurality of optically detectable marks disposed on a surface of the optical article; wherein the plurality of optically detectable marks are in a pre-determined combination of a first state and a second state; wherein the optical article comprises at least one first control logic comprising at least one sector on the optical article;
   wherein each optically detectable mark is associated with a particular first control logic;
   wherein each first control logic is executed only when its associated optically detectable mark is in a pre-determined state; and wherein a customized player-readable code is determined using a combination of the plurality of optically detectable marks and their associated first control logic.

40. The method of claim 39, further comprising a step of modifying the optical article to effect a change in a state of the plurality of optically detectable marks; wherein the optically detectable marks comprise an optical state change material.

41. The method of claim 39, further comprising a step of modifying the optical article to effect the formation of static marks on the surface of the optical article.

42. An optical article for playback in a player comprising:
a plurality of optically detectable marks disposed on a surface of the optical article; wherein the plurality of optically detectable marks are in a pre-determined combination of a first state and a second state; and
at least one first control logic comprising at least one sector;
wherein each optically detectable mark is associated with a particular first control logic;
wherein each first control logic is executed only when its associated optically detectable mark is in a pre-determined state; and
wherein a customized player-readable code is determined using a combination of the plurality of optically detectable marks and their associated first control logic;
wherein the first control logic is spaced at intervals in a data containing region of the optical article;
wherein each first control logic is executed at intervals during the playback of a content in the optical article; and
wherein the first control logic is executed as the optical article is read by a player; using a combination of the plurality of optically detectable marks in a pre-determined state associated with the first control logic.

43. The optical article of claim 42, wherein the customized player-readable code provides a serialized identification number for the optical article.

44. The optical article of claim 42, wherein the customized player-readable code is spaced at intervals in a data containing region of the optical article.

45. The optical article of claim 42, wherein for each bit of the customized player-readable code the player is directed to set the non-default value of the register using a forced activation method, wherein the register has a default value before it is set and a non-default value after it is set.

46. The optical article of claim 42, wherein the plurality of optically detectable marks comprise an optical state change material.

47. The optical article of claim 46, wherein a mark of the plurality of optically detectable marks is opaque in the first state and is transparent in the second state.

48. The optical article of claim 47, wherein a mark of the plurality of optically detectable marks is transparent in the first state and is opaque in the second state.

49. The optical article of claim 47, wherein the plurality of optically detectable marks comprise an optical state change material is printed using a method selected from one or more of a screen-printing method, a ink-jet printing method, a direct write method, a pad printing method, a microarray deposition method, a capillary dispensing method, a gravure printing method, a thermal transfer printing method, and adhesion of pre-made polymer films.

50. The optical article of claim 42, wherein the optically detectable marks comprise static marks.

51. The optical article of claim 50, wherein the static marks are made by distorting the surface of the optical article using heat.

52. The optical article of claim 42, wherein the plurality of optically detectable marks are disposed on a surface of the optical article on a data containing region of the optical article.

53. The optical article of claim 42, wherein the optical article comprises one of a CD, a DVD, a HD-DVD, a blu-ray disc, a near field optical storage disc, a holographic storage medium, another like volumetric optical storage medium, an identification card, a passport, a payment card, a driving license, or a personal information card.

54. The optical article of claim 42, wherein a mark of the plurality of optically detectable marks comprising an optical state change material is activated using one or more of a laser, a thermal energy, an electromagnetic radiation, a gamma ray, an acoustic wave, an electrical energy, a chemical energy, a magnetic energy, a mechanical energy, a radio frequency wave, and an ultraviolet radiation depending on the type of optical state change material included in the plurality of optically detectable marks.

55. A method of making an optical article for playback in a player comprising:
providing an optical article comprising a plurality of optically detectable marks disposed on a surface of the optical article; wherein the plurality of optically detectable marks are in a pre-determined combination of a first state and a second state; and at least one first control logic comprising at least one sector;
wherein each optically detectable mark is associated with a particular first control logic;
wherein each first control logic is executed only when its associated optically detectable mark is in a pre-determined state; and
wherein a customized player-readable code is determined using a combination of the plurality of optically detectable marks and their associated first control logic;
wherein the first control logic is spaced at intervals in a data containing region of the optical article;
wherein each first control logic is executed at intervals during the playback of a content in the optical article; and
wherein the first control logic is executed as the optical article is read by a player; using a combination of the plurality of optically detectable marks in a pre-determined state associated with the first control logic.

56. The method of claim 55, wherein a printing mechanism is aligned to the optical article in a manner such that the plurality of optically detectable marks are printed in a pre-determined data containing region on the optical article.

57. A system for playback of an optical article in a player comprising:
an optical article comprising a plurality of optically detectable marks disposed on a surface of the optical article; wherein the plurality of optically detectable marks are in a pre-determined combination of a first state and a second state; and at least one first control logic comprising at least one sector;
wherein each optically detectable mark is associated with a particular first control logic;
wherein each first control logic is executed only when its associated optically detectable mark is in a pre-determined state; and
wherein a customized player-readable code is determined using a combination of the plurality of optically detectable marks and their associated first control logic;
wherein the first control logic is spaced at intervals in a data containing region of the optical article;

wherein each first control logic is executed at intervals during the playback of a content in the optical article; and wherein the first control logic is executed as the optical article is read by a player; using a combination of the plurality of optically detectable marks in a pre-determined state associated with the first control logic.

58. A method for playback of an optical article in a player comprising:

providing an optical article comprising a plurality of optically detectable marks disposed on a surface of the optical article; wherein the plurality of optically detectable marks are in a pre-determined combination of a first state and a second state; and at least one first control logic comprising at least one sector;

wherein each optically detectable mark is associated with a particular first control logic;

wherein each first control logic is executed only when its associated optically detectable mark is in a pre-determined state; and wherein a customized player-readable code is determined using a combination of the plurality of optically detectable marks and their associated first control logic;

wherein the first control logic is spaced at intervals in a data containing region of the optical article;

wherein each first control logic is executed at intervals during the playback of a content in the optical article; and wherein the first control logic is executed as the optical article is read by a player; using a combination of the plurality of optically detectable marks in a pre-determined state associated with the first control logic.

59. A method for customizing an optical article for playback in a player comprising:

disposing a plurality of optically detectable marks on a surface of the optical article; wherein the plurality of optically detectable marks are in a pre-determined combination of a first state and a second state; and at least one first control logic comprising at least one sector;

wherein each optically detectable mark is associated with a particular first control logic;

wherein each first control logic is executed only when its associated optically detectable mark is in a pre-determined state; and wherein a customized player-readable code is determined using a combination of the plurality of optically detectable marks and their associated first control logic;

wherein the first control logic is spaced at intervals in a data containing region of the optical article;

wherein each first control logic is executed at intervals during the playback of a content in the optical article; and wherein the first control logic is executed as the optical article is read by a player; using a combination of the plurality of optically detectable marks in a pre-determined state associated with the first control logic.

* * * * *